US010567765B2

(12) United States Patent
Marlatt et al.

(10) Patent No.: US 10,567,765 B2
(45) Date of Patent: Feb. 18, 2020

(54) STREAMING MULTIPLE ENCODINGS WITH VIRTUAL STREAM IDENTIFIERS

(71) Applicant: Avigilon Corporation, Vancouver (CA)

(72) Inventors: Shaun P. Marlatt, Vancouver (CA); Oren Shir, Vancouver (CA); Peter W. Neufeld, Vancouver (CA); Van C. Nguyen, Vancouver (CA); Sina Afrooze, Vancouver (CA)

(73) Assignee: AVIGILON CORPORATION, Vancouver (CA)

( * ) Notice: Subject to any disclaimer, the term of this patent is extended or adjusted under 35 U.S.C. 154(b) by 228 days.

(21) Appl. No.: 14/568,070

(22) Filed: Dec. 11, 2014

(65) Prior Publication Data

US 2015/0201197 A1 Jul. 16, 2015

Related U.S. Application Data

(60) Provisional application No. 61/927,952, filed on Jan. 15, 2014.

(51) Int. Cl.
H04N 19/124 (2014.01)
H04N 19/119 (2014.01)
(Continued)

(52) U.S. Cl.
CPC ......... *H04N 19/124* (2014.11); *H04N 19/119* (2014.11); *H04N 19/12* (2014.11);
(Continued)

(58) Field of Classification Search
CPC .................................................. H04N 21/4728
See application file for complete search history.

(56) References Cited

U.S. PATENT DOCUMENTS 6,862,270 B1  3/2005  Ho
7,869,700 B2  1/2011  MacLean et al.
(Continued)

FOREIGN PATENT DOCUMENTS

CN  1450816 A  10/2003
CN  1145365 C   4/2004
(Continued)

OTHER PUBLICATIONS

International Patent Application No. PCT/US2014/071735; Int'l Preliminary Report on Patentability; dated Feb. 26, 2016; 10 pages.
(Continued)

*Primary Examiner* — Rebecca A Volentine
(74) *Attorney, Agent, or Firm* — BakerHostetler

(57) ABSTRACT

A system for streaming multiple encodings of a source video stream is disclosed. A source video device system captures and/or receives source video comprising a plurality of source video frames. The source video device system encodes the source video frames into virtual frames, with each of the virtual frames being encoded using at least one different encoding parameter. To each virtual frame is appended virtual stream identifier which is appropriate for a selected transmission mechanism. The source video device system forms a container frame from the virtual frames and transmits the container frame over a network. Devices receiving transmissions over unreliable connections may reconstruct the transmitted streams using the synchronization headers.

12 Claims, 18 Drawing Sheets

(51) Int. Cl.
| | |
|---|---|
| *H04N 19/179* | (2014.01) |
| *H04N 19/12* | (2014.01) |
| *H04N 19/162* | (2014.01) |
| *H04N 21/854* | (2011.01) |
| *H04N 21/235* | (2011.01) |
| *H04N 21/2343* | (2011.01) |
| *H04N 21/43* | (2011.01) |
| *H04N 21/4728* | (2011.01) |
| *H04N 21/2365* | (2011.01) |
| *H04N 19/172* | (2014.01) |
| *H04N 19/103* | (2014.01) |

(52) U.S. Cl.
CPC ......... *H04N 19/162* (2014.11); *H04N 19/179* (2014.11); *H04N 21/2353* (2013.01); *H04N 21/2365* (2013.01); *H04N 21/23439* (2013.01); *H04N 21/234363* (2013.01); *H04N 21/4307* (2013.01); *H04N 21/4728* (2013.01); *H04N 21/85406* (2013.01); *H04N 19/103* (2014.11); *H04N 19/172* (2014.11)

(56) References Cited

U.S. PATENT DOCUMENTS

| | | | |
|---|---|---|---|
| 8,270,469 B2 | 9/2012 | Chui et al. | |
| 2003/0161610 A1 | 8/2003 | Miyazawa et al. | |
| 2004/0257433 A1 | 11/2004 | Lia et al. | |
| 2005/0262258 A1 | 11/2005 | Kohno et al. | |
| 2006/0146934 A1 | 7/2006 | Caglar et al. | |
| 2006/0215752 A1* | 9/2006 | Lee | H04N 7/147 375/240.08 |
| 2007/0200923 A1 | 8/2007 | Eleftheriadis et al. | |
| 2008/0002777 A1 | 1/2008 | Hwang et al. | |
| 2008/0144711 A1* | 6/2008 | Chui | H04N 19/159 375/240.01 |
| 2009/0028238 A1 | 1/2009 | Collomosse et al. | |
| 2009/0320081 A1* | 12/2009 | Chui | H04N 7/17318 725/93 |
| 2011/0216243 A1* | 9/2011 | Sekiguchi | H04N 21/234327 348/581 |
| 2011/0276652 A1* | 11/2011 | Mukherjee | H04N 19/164 709/217 |
| 2011/0280311 A1 | 11/2011 | Chen et al. | |
| 2012/0033738 A1 | 2/2012 | Bakke | |
| 2012/0300030 A1 | 11/2012 | Paczkowski et al. | |
| 2012/0301108 A1 | 11/2012 | Zetterower et al. | |
| 2013/0070051 A1* | 3/2013 | Ho | H04N 13/0431 348/43 |
| 2013/0070859 A1* | 3/2013 | Lu | H04N 19/39 375/240.25 |
| 2013/0170816 A1 | 7/2013 | Katcher et al. | |
| 2013/0307942 A1* | 11/2013 | Dini | H04N 5/44591 348/51 |
| 2013/0322517 A1* | 12/2013 | Zurpal | H04N 19/56 375/240.02 |
| 2013/0336379 A1 | 12/2013 | Erofeev et al. | |
| 2013/0336412 A1 | 12/2013 | Erofeev et al. | |
| 2014/0010289 A1* | 1/2014 | Lukasik | H04N 19/119 375/240.08 |
| 2014/0036999 A1* | 2/2014 | Ryu | H04N 19/50 375/240.12 |
| 2014/0079126 A1* | 3/2014 | Ye | H04N 19/105 375/240.16 |
| 2014/0092963 A1* | 4/2014 | Wang | H04N 19/50 375/240.12 |
| 2014/0192199 A1* | 7/2014 | Tan | H04N 21/2187 348/159 |
| 2014/0359680 A1* | 12/2014 | Shivadas | H04N 21/8455 725/90 |
| 2015/0116451 A1 | 4/2015 | Xu et al. | |
| 2015/0199366 A1 | 7/2015 | Marlatt et al. | |
| 2015/0201197 A1 | 7/2015 | Marlatt et al. | |
| 2015/0245063 A1* | 8/2015 | Rusanovskyy | H04N 19/597 375/240.12 |
| 2015/0281669 A1* | 10/2015 | Arena | H04N 19/597 375/240.24 |
| 2016/0029091 A1* | 1/2016 | Le Floch | H04N 21/234345 375/240.26 |
| 2016/0165248 A1* | 6/2016 | Lainema | H04N 19/70 375/240.08 |
| 2016/0165309 A1* | 6/2016 | Van Brandenburg | H04N 21/4728 725/116 |
| 2016/0212405 A1* | 7/2016 | Zhang | H04N 19/597 |

FOREIGN PATENT DOCUMENTS

| | | |
|---|---|---|
| JP | 2005-318411 A | 11/2005 |
| JP | 2009-027366 A | 2/2009 |
| JP | 2013-179573 A | 9/2013 |
| KR | 10-2012-0133006 A | 12/2012 |
| WO | WO 2012/168365 A | 12/2012 |

OTHER PUBLICATIONS

International Patent Application No. PCT/US2014/071746; Int'l Preliminary Report on Patentability; dated Mar. 16, 2016; 6 pages.
International Patent Application No. PCT/US2014/71746; Int'l Search Report and the Written Opinion; dated May 28, 2015; 20 pages.
U.S. Appl. No. 14/568,081; Final Office Action; dated Mar. 20, 2017; 11 pages.
U.S. Appl. No. 14/568,081; Office Action; dated Sep. 8, 2016; 13 pages.
Shuichi Aoki; "Media Transport Technologies for Next Generation Broadcasting Systems"; NHK STRL R&D; No. 140; Jul. 2013; p. 22-31 (contains abstract).
Iraj Sodagar; "The MPEG-DASH Standard for Multimedia Streaming Over the Internet"; IEEE MultiMedia; vol. 18 No. 4; Nov. 2011; p. 62-67.
Lim et al.; "MMT: An Emerging MPEG Standard for Multimedia Delivery over the Internet"; IEEE MultiMedia; vol. 20 Issue 1; 2013; p. 80-85 (abstract only).
European Patent Application No. 14878907.6; Extended Search Report; dated Sep. 15, 2017; 18 pages.

* cited by examiner

STREAMING MULTIPLE ENCODINGS WITH VIRTUAL STREAM IDENTIFIERS

CROSS REFERENCE TO RELATED APPLICATIONS

The present application claims priority to U.S. Provisional Patent Application No. 61/927,952 filed on Jan. 15, 2014, the contents of which are hereby incorporated herein by reference in its entirety.

TECHNICAL FIELD

The current disclosure relates to encoding video data, and in particular, to providing and streaming multiple encodings.

BACKGROUND

In a typical video surveillance system, one or more cameras may be communicatively coupled to a server system. As video data is recorded by the cameras, it is forwarded to the server system where it is stored for subsequent retrieval. Client systems are communicatively coupled to the server system and may be used to request and receive streams of recorded video data.

Various technologies have been developed for use in streaming video data to clients. However, existing technologies are lacking. For example, many technologies fail to adequately address the need for synchronization between related video encodings.

SUMMARY

According to an aspect of the disclosed embodiments, a method for encoding source video is disclosed. In an example embodiment, upon receipt of a source frame of a source video, different virtual frames of the source frame are encoded, with each of the different virtual frames being encoded using at least one different encoding parameter. A container frame is formed from the virtual frames and transmitted over a network. In an example embodiment, the container frame comprises the virtual frames and a container timestamp applicable to all of the virtual frames in the container frame.

In an example scenario, the virtual frames are concatenated together in the container frame, with each of the virtual frames comprising a virtual frame header having a delimiter that delimits the virtual frames from each other. The container frame may comprise a container frame header comprising the container timestamp. The container frame timestamp is the same as a timestamp comprised in the source frame from which the virtual frames were generated.

The encoding parameters that are used to encode the virtual frames may be any suitable parameter and may be selected, for example, from the group comprising region of interest of the source frame, frame rate, video quality, compression ratio, quantization parameters, video resolution, and compression technique/encoding format.

In an example embodiment, a video source device encodes and transmits the virtual frames to a control server. The video source device may comprise, for example, a processor for receiving a source frame of the source video, and a memory communicatively coupled to the processor that has stored therein statements and instructions to cause the processor to encode the source frames and transmit encoded frames as described herein.

According to aspect of disclosed embodiments, the control system may transmit configuration commands to the video source device in order to configure a plurality of encoding components to provide a plurality of different and independent resolution encodings. The commands may specify that at least one of the resolution encodings comprises a plurality of individually encoded virtual streams. The control system may receive from the video source device a description of a plurality of individual virtual streams that the video source device is configured to provide, where each of the resolution encodings comprise one or more of the individual virtual streams. When the control system receives a data stream of the plurality of individual virtual streams, the system associates each of the plurality of individual virtual streams with the respective resolution encoding.

According to another aspect of the disclosed embodiments, the control server may stream encoded video to client systems. In an example embodiment, the control server receives client streaming parameters comprising information indicative of which of multiple encodings are to be sent to the client. Each of the multiple encodings may comprise video data encoded using at least one different encoding parameter. The server determines which of the multiple encodings satisfy the client streaming parameters and transmits to the client the one or more multiple encodings that satisfy the client streaming parameters. The encoding parameters may be any suitable parameter and may be selected, for example, from the group comprising: region of interest of the source frame; frame rate; video quality; compression ratio; quantization parameters; video resolution; and compression technique/encoding format. In an example embodiment, multiple encodings may comprise first and second encodings encoded according to non-identical first and second regions of interest (ROIs), respectively. The ROIs may be mutually exclusive.

According to another aspect of the disclosed embodiments, the first and second encodings may be displayed on a monitor. In an example scenario, the first and second encodings may be displayed on adjacent portions of the monitor. In still another example scenario, the ROIs may at least partially overlap. The first ROI may be a subset of the second ROI and the first encoding may be encoded at a higher resolution than the second encoding.

According to another aspect of the disclosed embodiments, a method is disclosed for displaying multiple encodings, where each encoding comprises video data encoded using at least one different encoding parameter. In an example scenario, the method may comprise receiving, at a client, the multiple encodings, wherein the multiple encodings comprise first and second encodings encoded according to non-identical first and second regions of interest (ROIs), respectively. In an example scenario, the ROIs may be mutually exclusive. The encodings may be transmitted to the client as part of a container frame. The container frame may comprise multiple virtual frames each of which corresponds to one of the encodings, and may also comprise a container timestamp applicable to all of the virtual frames. The first and second encodings are displayed on a monitor of the client.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Figure 1:
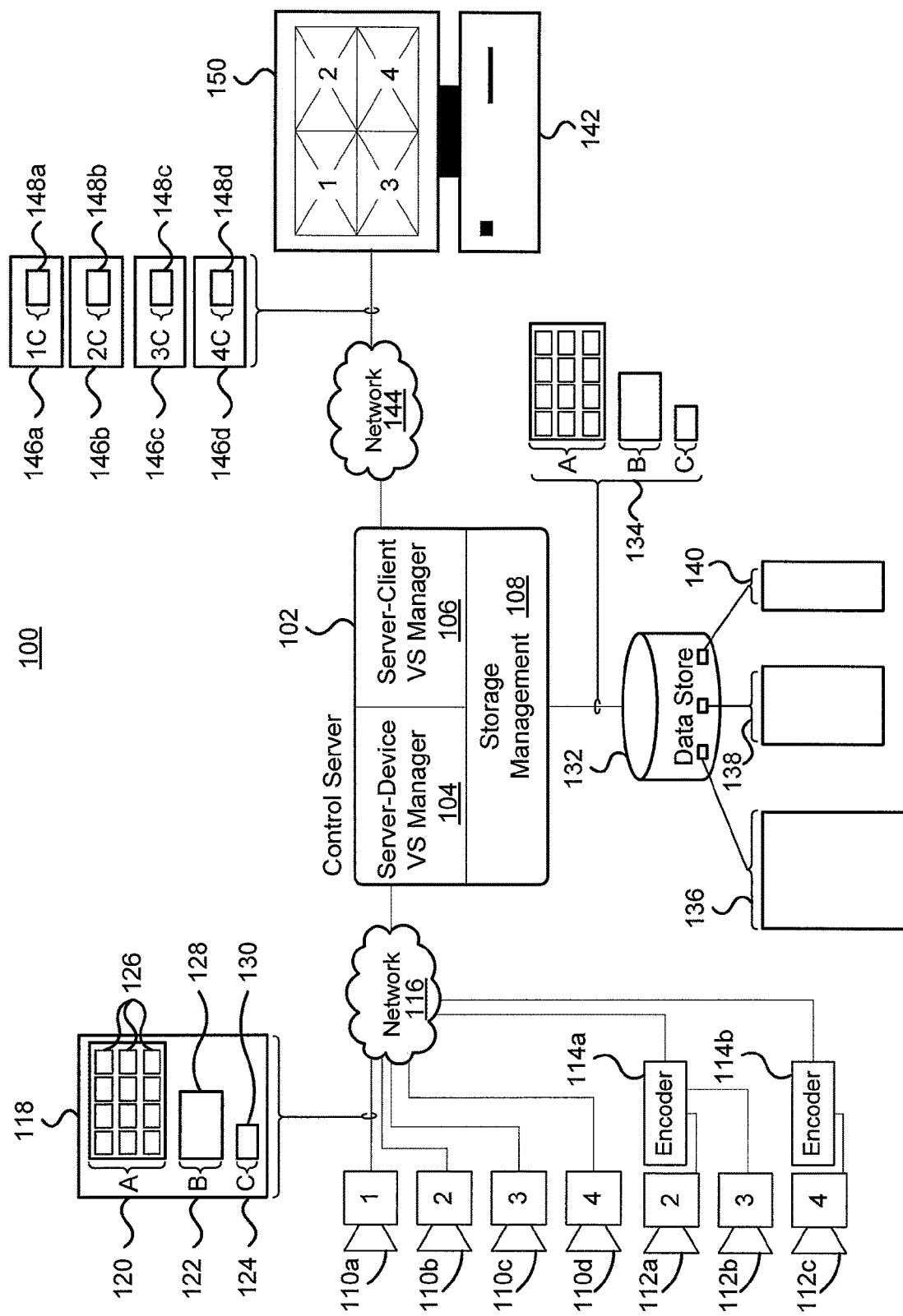
FIG. 1 depicts an example surveillance system adapted to generate and store multiple resolution encodings.

Applicants disclose herein systems and methods for streaming multiple encodings of a source video stream. In an example embodiment, a source video device system may capture and/or receive source video comprising a plurality of source video frames. A video prior to encoding is referred to as a "source video," with each frame of the video being a "source frame." The source video device system encodes the source video frames into virtual frames, with each of the virtual frames being encoded using at least one different encoding parameter. The encoding parameters may be any that are suitable including, for example, a region of interest, frame rate, video quality, video resolution, and compression technique/encoding format. The source video device system forms a container frame from the virtual frames and transmits the container frame over a network. In an example embodiment, the container frame comprises the virtual frames associated with a particular source frame and a container timestamp applicable to all of the virtual frames in the container frame.

When transmitting multiple encodings of a source video to a client, it is desirable for the client to be able to synchronize the frames from the multiple encodings it receives. Synchronization addresses at least two issues:

1) When the client switches from one of the encodings to another, any time-offset between the encodings will manifest as a discontinuity, or "jump" in time, in the video, which is undesirable.

2) When the client is simultaneously displaying encodings that represent adjacent regions of interest (hereinafter interchangeably referred to as "ROIs") of the source video, any time-offset between those encodings causes any objects that cross between those regions of interest to also experience a discontinuity, or "jump" in time, which prevents the objects from transitioning smoothly between those regions of interest. This is also undesirable.

There are several conventional ways of synchronizing video. For example, when an encoding is formed using the JPEG2000 format, different resolutions and image tiles can be embedded into the same bitstream. Problems with this technique include that the compression standard is limited to JPEG2000, which has not been widely adopted in the consumer space, and that separating the different resolutions and tiles from one another requires parsing the bitstream.

As another example, when transmitting video over Real-time Transport Protocol (RTP), which is the most common media transport protocol for real-time transmission, RTP Control Protocol (RTCP) is used to recover a Coordinated Universal Time (UTC) time, generated by the camera that generates and transmits the streams, for each video frame of each stream. When transmitting multiple encodings in this fashion, the camera uses a different RTP stream to transmit each of the encodings. It is possible to recover the UTC time for the frames and use that time to synchronize video from different streams. However, the UTC on the camera time may experience discontinuities or "jumps" in time due to changes in the time-source it is synchronized to or due to inaccuracies in that time-source. Any jumps in the UTC time will result in a change in the recovered UTC time for each frame. However, this time change will not affect each stream simultaneously. Consequently, the frames of different streams will be temporarily out of sync on every occasion of UTC time jump on the camera. This is undesirable from the user's point of view.

In order to avoid the need for synchronization of frames between different streams on the client, and as described herein, it is possible to synchronize the frames of the different encodings on the camera, wrap all frames with the same UTC timestamp into a container frame, and transmit a single stream of container frames to the client. A video source device, such as, for example, a camera, generates source video comprising source frames. The camera applies a UTC timestamp to each source frame ("source frame timestamp"). The video source device generates multiple encodings of each source frame, each of which is distinguished from the other encodings by using at least one different encoding parameter. Because each of the source frame encodings is generated from the same source frame, they all share the same timestamp. The video source device generates a container frame from the source frame encodings sharing a common timestamp. The video source device appends a timestamp ("container timestamp") to a header of the container frame ("container frame header") that is identical to the timestamps of the various source frame encodings. The video source device also generates what are hereinafter referred to as "virtual frames," by generating frames each of which comprises a different source frame encoding with a header ("virtual frame header") that includes a delimiter comprising a virtual stream identifier, or "vstream id", as discussed in further detail below. The virtual frames of any one of the multiple encodings collectively comprise a "virtual stream." As used herein, container and virtual frames typically refer to data structures at the application layer of the OSI model, as compared to a data structure at the data link layer of the OSI model.

Example Encoding Systems

FIG. 1 depicts a surveillance system 100 capable of providing multiple resolution encodings of video. While the example embodiment of FIG. 1 uses multiple resolutions of different source region of interests as an example of encoding parameters that can differ between virtual streams, in alternative examples any one or more encoding parameters can differ between the virtual streams. The system 100 includes a control server 102 that provides various functionality including receiving video from a plurality of video source devices 110, 114, managing the storage of the received videos, and streaming videos to one or more clients 142. The control server 102 may be provided by one or more physical computers and/or by one or more virtual computers. In one alternative embodiment (not depicted), the control server 102 functionality can be implemented by one or more of the video source devices 110, 114 themselves, which can then directly send the multiple resolution encodings to the clients 142. The control server 102 may be connected to a plurality of digital IP cameras 110a, 110b, 110c, 110d (referred to collectively as IP cameras 110) as well as a plurality of streaming encoders 114a, 114b (referred to collectively as encoders 114), which may be coupled to one or more digital or analog cameras 112a, 112b, 112c (referred to collectively as cameras 112). The IP cameras 110 and the encoders 114 may be referred to collectively as video source devices. The video source devices may stream video to the control server 102 over a network 116. The network 116 may comprise any suitable technology and may be provided by one or more individual networks, including, for example, wired local area networks (LANs), wireless local area networks (WLAN), as well as wide area networks (WAN).

The control server 102 may comprise virtual stream manager functionality. The virtual stream manager resident on the control server 102 that manages the virtual streams that the control server 102 receives from the devices is hereinafter the "server-device virtual stream manager" or "server-device VS manager" 104. The server-device VS manager 104 provides functionality for configuring the video source devices 110, 114 in order to stream independent multiple resolution encodings. The server-device VS manager 104 may also comprise functionality to receive streams from video source devices 110, 114 and demultiplex the received streams into the individual virtual streams. The demultiplexed virtual streams may be combined and re-multiplexed in different ways, including, for example, by removing one or more of the virtual streams. The individual virtual streams of a stream from the video source devices 110, 114 can be provided to the storage management functionality 108 for storage. Further, one or more of the individual virtual streams may be provided to additional virtual stream manager functionality; in particular, the virtual stream manager resident on the control server 102 that manages the virtual streams that the control server 102 sends to the client 142 is hereinafter the "server-client virtual stream manager" or "server-client VS manager" 106. The individual virtual streams may be provided to the server-client VS manager 106 either from the storage management functionality 108 or from the server-device VS manager 104. The server-client VS manager 106 streams one or more virtual streams to a client 142 over a network 144.

Each of the video source devices 110, 114 may be configured to provide various virtual stream encodings depending upon the capabilities of the respective video source devices 110, 114, the capabilities of other components, such as the bandwidth of network 116, the bandwidth of network 144, the available storage space as well as the requirements of the surveillance system, as well as other suitable parameters material to operation of the video source devices 110, 114. The video source devices 110, 114 may provide a single resolution encoding, or a plurality of individual resolution encodings. Further, each resolution encoding may be provided by a number of virtual streams. Stream 118 is depicted in FIG. 1 as being streamed from I P camera 110 to the control server 102 over network 116.

As depicted, the stream 118 comprises a number of individual resolution encodings 120, 122, 124. The individual resolution encodings 120, 122, 124 are depicted as encoding the same portion of the source video, which is contemplated as being substantially all of the region of interest of a sensor of the camera 110a. For example, the resolution encoding 120 may be encoded to the full resolution of the source, the resolution encoding 122 may be encoded to a half of the source resolution and the resolution encoding 124 may be encoded to a quarter of the source resolution. Each of the individual resolution encodings 120, 122, 124 encodes the source video using a respective encoding format such as H.264 or JPEG. In alternative embodiments, instead of adjusting resolution, the stream 118 may be encoded by varying one or more different encoding parameters, such as frame rate and video quality, additionally or alternatively to resolution.

Each of the individual resolution encodings 120, 122, 124 may be provided by one or more virtual streams 126, 128, 130 within the stream 118. Each virtual stream 126, 128, 130 comprises at least a portion of the video source encoded at the compression level of the respective resolution encodings 120, 122, 124. As depicted, the full resolution encoding 120 is provided by a 3×4 tiling of virtual streams. Each of the 12 virtual streams 126 is encoded with the same encoding format, and when the 12 virtual streams are combined they provide the full resolution of the source video. In an alternative embodiment, different encoding formats or different encoding parameters can be used to encode any one or more of these 12 virtual streams. The resolution encoding 122 is depicted as being provided by a single virtual stream. Accordingly, the virtual stream 128 may have a resolution of ½ of the video source. Similarly, the virtual stream 130 may have a resolution of ¼ of the video source. Although described as providing a tiling of a larger area, the virtual streams do not need to form tiles; rather, each virtual stream may encode a particular region of interest, which may comprise the full source video, or a portion thereof. The various virtual streams may overlap the same region of interest, or encode non-overlapping portions of the source video.

The server-device VS manager 104 may receive streams from the video source devices 110, 114, such as stream 118. The server-device VS manager 104 may demultiplex the virtual streams of individual resolution encodings 120, 122, 124 from the received stream 118, and the demultiplexed virtual streams may be passed to the storage management functionality 108. Additionally, one or more of the virtual streams may be passed to the server-client VS manager 106 for streaming to the client 142.

As depicted, the storage management functionality 108 stores the virtual streams of the resolution encodings in a data store 132. The storage management functionality 108 may pass each of the resolution encodings 134 to the data store. The storage management functionality 108 and data store 132 may store the video data in different storage sections or tiers to reduce the amount of storage required. As depicted, a short term storage tier 136 may store each of the resolution encodings. After a period of time has passed, it may be determined that the full resolution encoding is no longer required to be stored. The full resolution encoding may be removed from storage, and the remaining resolution encodings stored in storage tier 138. Similarly, after a period of time, it may be determined that the medium resolution encoding is no longer required to be stored, and as such it can be removed from storage and the remaining resolution encoding stored 140. In an example embodiment, the virtual streams are stored separately in each of the storage areas or tiers 136, 138, and 140, and the age or length of time each virtual streams has been stored is maintained independently. In such an embodiment, after a period of time has passed, a container frame may be reconstructed from the virtual streams that remain stored in the storage areas 136, 138, and 140.

The data store 132 may be provided by the same computing system as the control server. Additionally or alternatively, the data store may be provided by separate computing devices. Further still, although depicted as being directly connected to the control server, it is contemplated that the data store may be coupled to the control server by a network.

As described above, the server-client VS manager 106 may receive resolution encodings from either the server-device VS manager 104 or the storage management functionality 108 for streaming to a monitoring client 142 over network 144. The resolution encodings may be from different video source devices. As depicted, each resolution encoding 146a, 146b, 146c, 146d may be streamed individually, or one or more of resolution encodings may be combined together into a single stream. As depicted, a number of virtual streams 148a, 148b, 148c, 148d corresponding to the low resolution encodings from different video source devices are streamed to the monitoring device 142. The monitoring device 142 may receive and decode the virtual streams 148a, 148b, 148c, 148d and display the decoded video 150.

Alternatively, not shown in FIG. 1, a client device such as the monitoring client 142, or a client process running on a server such as the control server 102, may receive and decode one or more of the virtual streams 148a, 148b, 148c, 148d to create a composite video stream that is like the video 150, but not display it. Instead, such a client device or process may re-encode the composite video stream to be displayed on a mobile device, such as a cellular telephone, laptop computer, tablet, etc., and then transmit re-encoded composite stream to the mobile device via a network such as network 116 or network 144. The mobile device may then display the video in the mobile format for the user of the mobile device.

Figure 2:
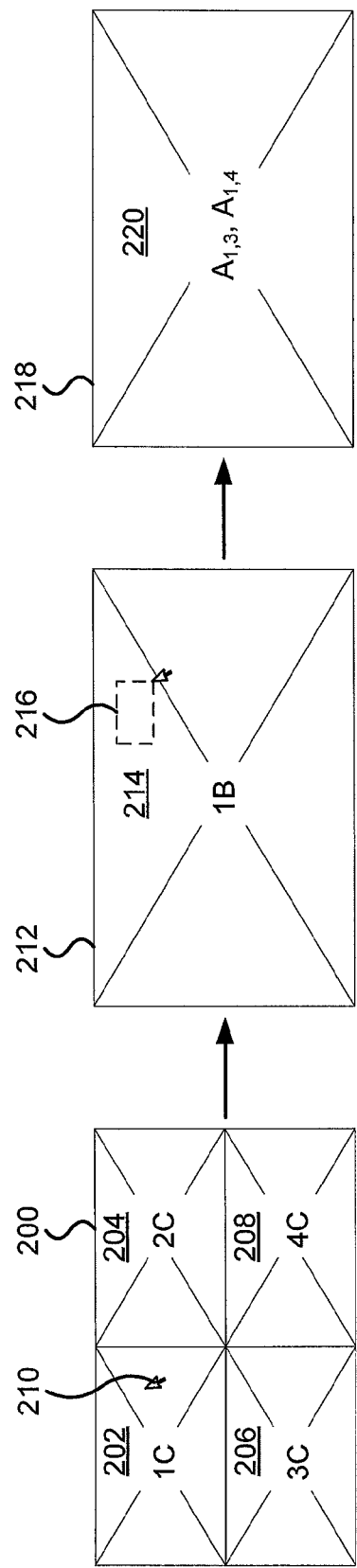
FIG. 2 depicts an example display monitor adapted to display multiple resolution encodings.

FIG. 2 depicts a monitor displaying different resolution encodings of video; the monitor may be a computer monitor, but alternatively it may be any suitable display, such as a display of a tablet computer, smartphone display, or tiled display. FIG. 2 depicts 3 different views 200, 212, 218. Initially, the monitoring client displays view 200, which comprises the lowest resolution encodings 202, 204, 206, 208 of four virtual streams. For example, the virtual streams from four different cameras may be displayed simultaneously. One of the low resolution encodings 202 may be selected for zooming in on, for example by clicking on it with a mouse or other pointer 210. When the resolution encoding 202 is displayed full screen, the quality of the encoding may be lower than desired. Accordingly, the medium resolution encoding 214 from the selected camera view can be streamed and displayed as depicted in view 212. A user may wish to zoom-in further in order to view a portion 216 of the displayed resolution encoding 214. Again, the quality of the resolution encoding 214 may not be sufficient when zoomed-in to provide the desired image quality. Accordingly, the full resolution encoding can be used in displaying the zoomed in portion 220 as depicted in view 218.

As described above, the full resolution encoding may comprise a number of virtual streams. Accordingly, only the virtual streams of the full resolution encoding that cover the selected zoomed-in region need to be streamed to the monitoring client 142. For example, if the full resolution is provided as a 4×3 grid of virtual streams the virtual streams in the top row and the third and fourth columns may cover the desired region.

As described above, providing multiple virtual streams allows efficient bandwidth usage when streaming video to a monitoring location regardless of if video from multiple cameras are being displayed, or if only a small portion of a single camera is zoomed into for display.

Figure 3:
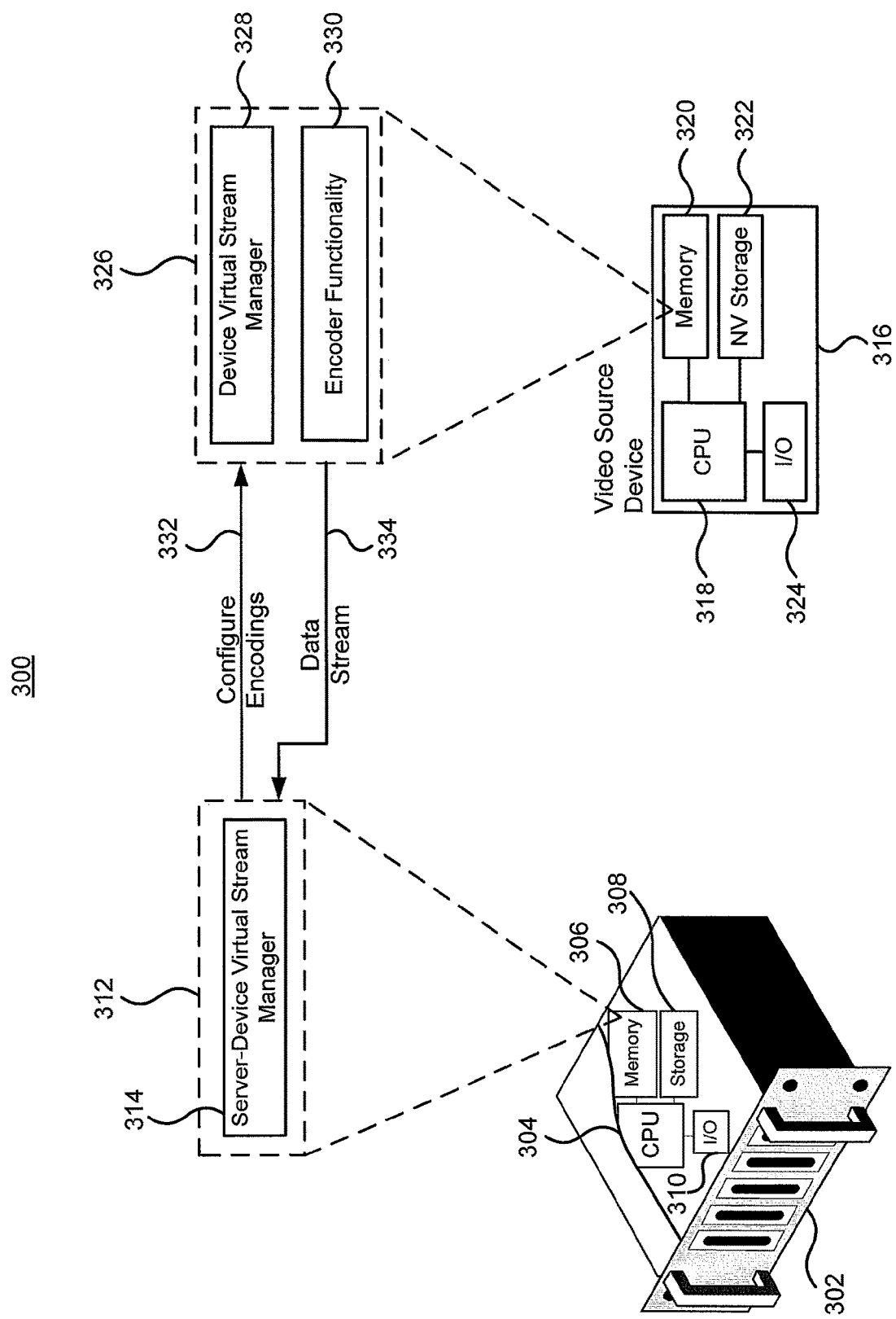
FIG. 3 depicts an example video source device and control server adapted to generate and receive multiple resolution encodings.

FIG. 3 depicts a video source device and functionality as well as a control server and functionality capable of streaming multiple resolution encodings. The system 300 is depicted as comprising a control server 302 and a video source device 316. The control server 302 comprises a central processing unit 304 for processing instructions. The instructions may be stored in memory 306. The control server 302 may further comprise non-volatile storage 308 for persistent storage of data and instructions. The control server 302 may further comprise one or more input/output (I/O) interfaces 310. The I/O interfaces allow input and/or output components to be connected to the control server. For example, a network interface card (NIC) may be connected to the control server 302 in order to connect the control server 302 to a communication network.

The CPU 304 may execute instructions stored in memory. The instructions, depicted as 312, when executed may configure the control server 302 to perform the functionality described above, and also to implement the server-device VS manager 314 whose functionality is described below.

The video source device 316, which may be, for example, a camera device or system, comprises a central processing unit 318 for processing instructions. The instructions may be stored in memory 320. The video source device 316 may further comprise non-volatile storage 322 for persistent storage of data and instructions. The video source device 316 may further comprise one or more input/output (I/O) interfaces 324. The I/O interfaces allow input and/or output components to be connected to the video capture. For example, a network interface card (NIC) may be connected to the input/output interface 324 in order to connect the video source device 316 to a communication network. Further, if the video source device 316 is a camera, whether IP or analog, the I/O interface may further connect a sensor to the CPU for capturing image data.

The CPU 318 may execute instructions stored in memory. The instructions, depicted as 326, when executed may configure the video source device 316 to provide the device virtual stream (VS) manager 328 as well as encoder functionality 330.

The server-device virtual stream (VS) manager 314 of the control server 302 and the device VS manager 328 of the video source device 316 cooperate in order to configure 332 video source device 316, which may include, for example, a camera, as desired or required. The encoder functionality 330 may be configured in order to provide multiple encoding components that can each encode video and specified settings, which may include a number of rows and columns of individually encoded tiles. The encodings provided by the encoding components can be streamed to the control server 302 as depicted by data stream 334.

It will be appreciated that while the Figures and description herein refer to video source device 316 and server 102 separately, in some embodiments the functionality from both described systems may exist in a single system. For example, the video source device 316 may be a camera system that provides all of the functionality described herein relating to cameras and image collection, as well as the functionality described herein relating to control server 102. In such an embodiment, a camera system may operate as a server with the ability to control and communicate with other camera systems.

Figure 4:
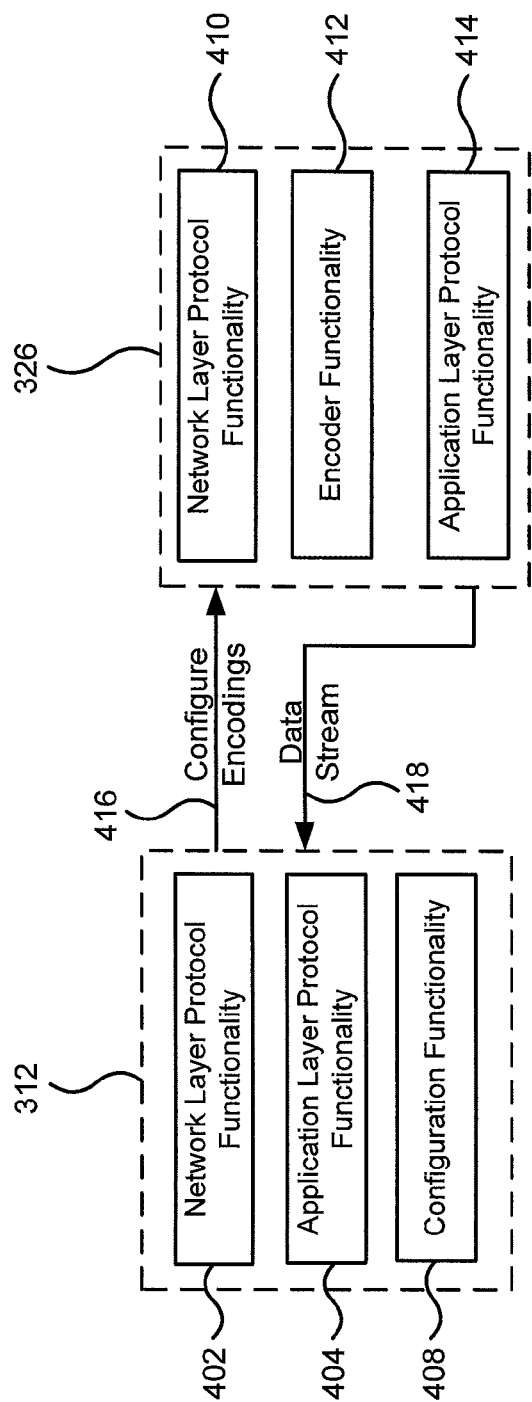
FIG. 4 depicts example functional features provided by video source device and control server.

FIG. 4 depicts a further video source device functionality and control server functionality capable of streaming multiple resolution encodings. The functionality may be provided in, for example, the control server 302 described above by instructions stored in the memory. When executed by the CPU of the control server 302, the instructions may provide network layer protocol functionality 402, application layer protocol functionality 404, and configuration functionality 408. It will be appreciated that other functionality may be provided in the control server 302.

Similarly, video source device functionality may be provided in a video source device such as the video source device 316 described above by executing instructions by a processor. The video source device functionality may include network layer protocol functionality 410, encoder functionality 412 and application layer protocol functionality 414. The video source device may provide additional functionality not depicted in FIG. 4.

The network layer protocol functionality 402, 410 of the control server 302 and the video source device 316 cooperate in order to configure the video source device 316 in the desired manner. The network layer protocol functionality 402, 410 provides a standardized network interface for video devices and allows for the discovery, configuration, management and control of compliant devices. The network layer protocol functionality 402, 410 provides a common interface between the control server 302 and the video source device 316 that allows the discovery of the video source device 316 and its capabilities as well as the configuration of the device 316. As described further below, the network layer protocol functionality 402, 410 may be used to configure the encoder functionality 416 in order to set the device 316 up to stream multiple independent resolution encodings, including encodings of particular regions of interest, as described above. Once configured as desired, the video source device 316 may encode source video using the configured encoder functionality in order to provide a data stream of the configured resolution encodings. The data stream from the encoder can be transmitted from the video source device 316 to the control server 302 using application layer protocol functionality 404, 414 which provide for real time control and transport of the data stream 418.

Once the data stream 418 is received at the control server 302, it may be processed in order to group virtual streams belonging to the same resolution encoding together. As described above, a single resolution encoding may be composed of one or more independently encoded regions of interest. The resolution encodings may then be further processed as desired, for example for storage or streaming to a monitoring client.

The control server 302 may also comprise configuration functionality 408. The configuration functionality 408 may allow a user to set, view and/or modify configuration parameters of components of the surveillance system. For example, the configuration functionality may allow a desired encoder configuration for video source devices.

Figure 5A:
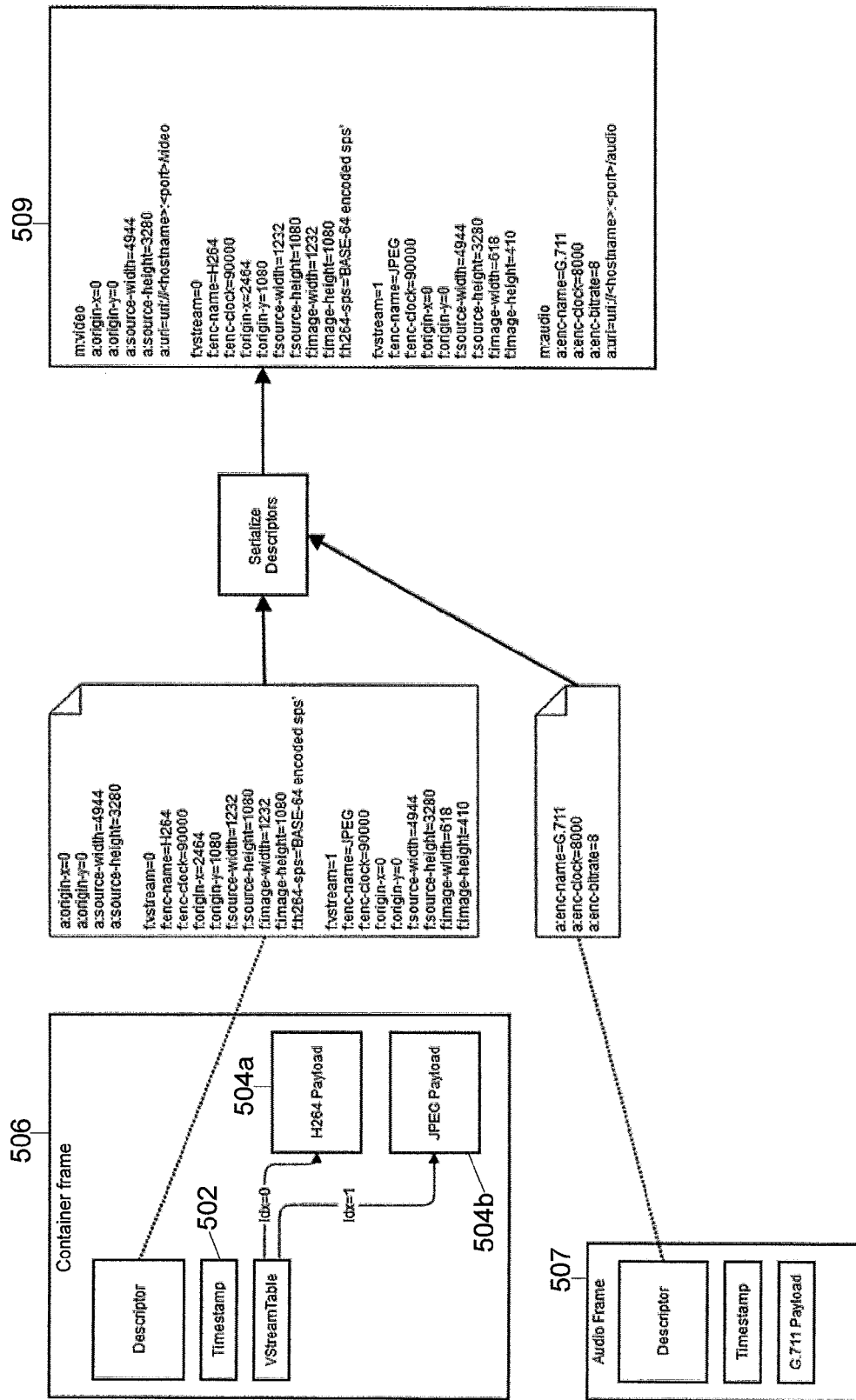
FIG. 5A depicts an example container frame comprising multiplexed virtual frames and descriptors used to describe those virtual frames.

FIG. 5A depicts a container frame 506 comprising multiplexed virtual frames and descriptors used to describe those virtual frames. In FIG. 5A, two frames are shown that are associated with a single session: the container frame 506, which stores video data, and an audio frame 507, which stores corresponding audio data. The container frame 506 and audio frame 507 are depicted as in-memory representations of the data structures used to hold the video and audio data, respectively. Each of the frames 506, 507 comprises a descriptor, timestamp, and payload. The payload of the container frame 506 comprises an indirection table that points to the payloads of each of the virtual streams. It will be appreciated that while in the example embodiment of FIG. 5A, audio frames are associated with the video frames, the audio frames are optional. Moreover, audio frames are merely exemplary and other information such as, for example, meta data may similarly be streamed with the virtual frames in the manner described herein in connection with audio frames.

As discussed in further detail with respect to FIG. 6, below, prior to transmitting the container and audio frames 506, 507 from the video source devices to the control server 302, session descriptions are first described over a reliable transport mechanism such as TCP, HTTP, or RTSP. The descriptors from the container and audio frames 506, 507 are retrieved from those frames 506, 507 and serialized into session description information 509, which in one embodiment may exist in computing memory as a file The description information/file 509 lists the properties of the audio and video comprising the container and audio frames 506, 507, as well as the uniform resource identifier (URI) from which transport can be established to stream those media files over the network. The virtual streams comprise additional properties such as a vstream id, which is used for packet-level transport multiplexing and demultiplexing, and encoding parameters such as the source ROI and image resolution.

In one embodiment, each of the frames 506, 507 is packetized and sent from the video source device to the control server over an unreliable transport mechanism such as UDP. In alternative embodiments, different transport mechanisms may be used to transmit the frames 506, 507.

Figure 5B:
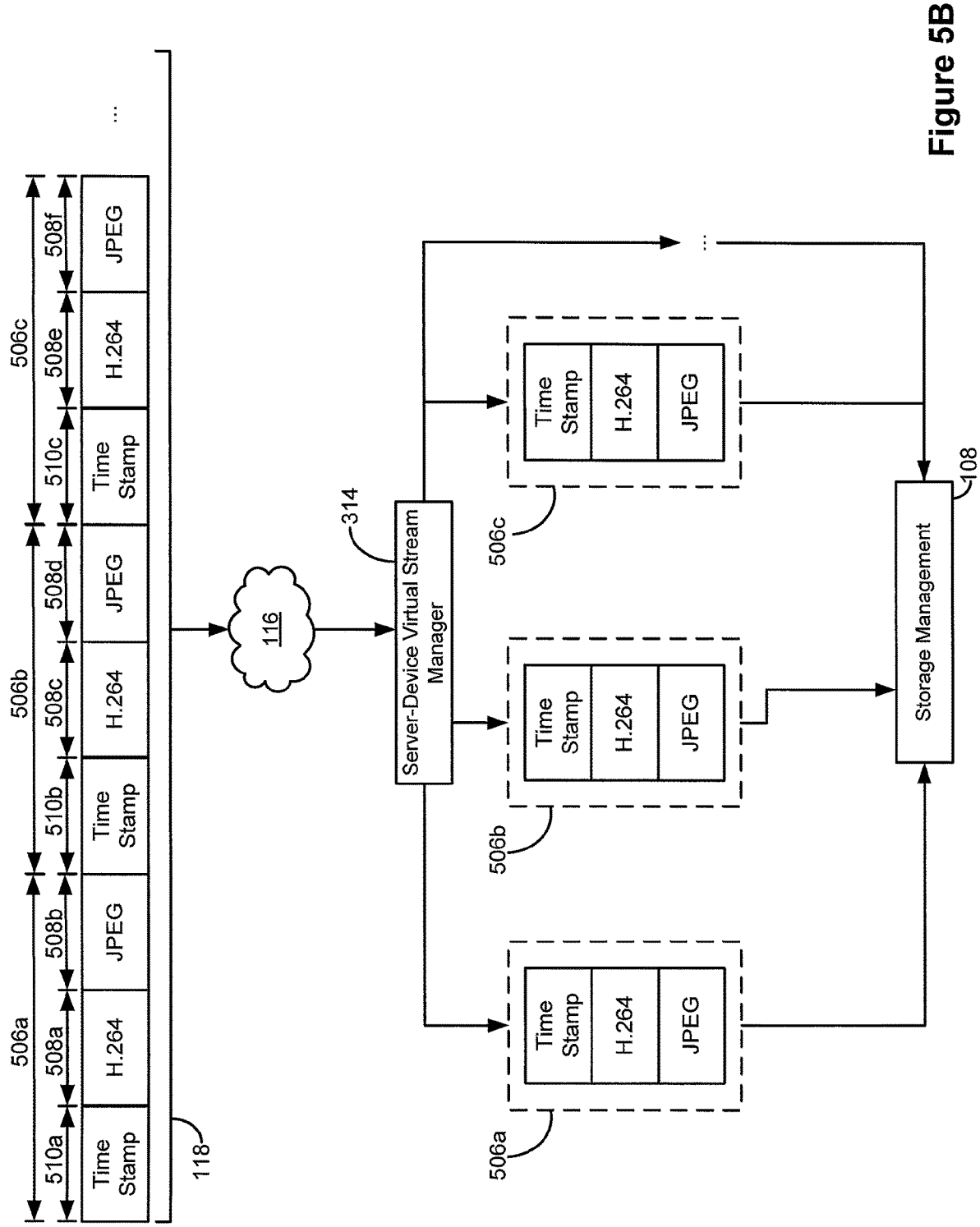
FIG. 5B depicts an example video stream comprising multiplexed container frames being demultiplexed and processed by the control server.

The portion of the video stream 118 shown in FIG. 5B comprises first and second container frames 506*a-c* (collectively, "container frames 506") prepared by the video source devices prior to their transmission over the network 116 to the control server. Each of the container frames 506*a-c* respectively comprises a time stamp 510*a-c* common to all the virtual frames 508 of that container frame 506a-c. Each of the virtual frame headers comprises a frame delimiter delimiting each of the virtual frames 508 from one another; in this example embodiment, the frame delimiter comprises the vstream id. The container frames 506 in FIG. 5B each comprises one virtual frame 508a, c, e for the H.264 encoded video, and another virtual frame 508b, d, f for the JPEG encoded video. As opposed to sending the H.264 and JPEG video to the control server over separate streams each with its own timestamp, in the depicted embodiment placing the H.264 and JPEG videos into the container frames 506 and then transmitting the container frames 506 essentially time division multiplexes the H.264 and JPEG videos to the control server.

Associating a group of virtual frames 508 with a single source frame time stamp facilitates synchronization between virtual frames 508 and, consequently, video from different virtual streams that is displayed on the client 142, and reductions in latency. When the server-device VS manager 314 receives the stream 118, it is able to demultiplex each of the container frames 506 based on the time stamp 510 of each frame 506, and is subsequently able to demultiplex the container frames 506 from each other and each of the virtual frames 508 from any other virtual frames 508 within the container frame 506, as depicted in FIG. 5B. The control server 302 can subsequently process any one or more of the container frames 506 and virtual frames 508 as desired, such as by storing the container frames 506 in the data store 132.

Figure 6:
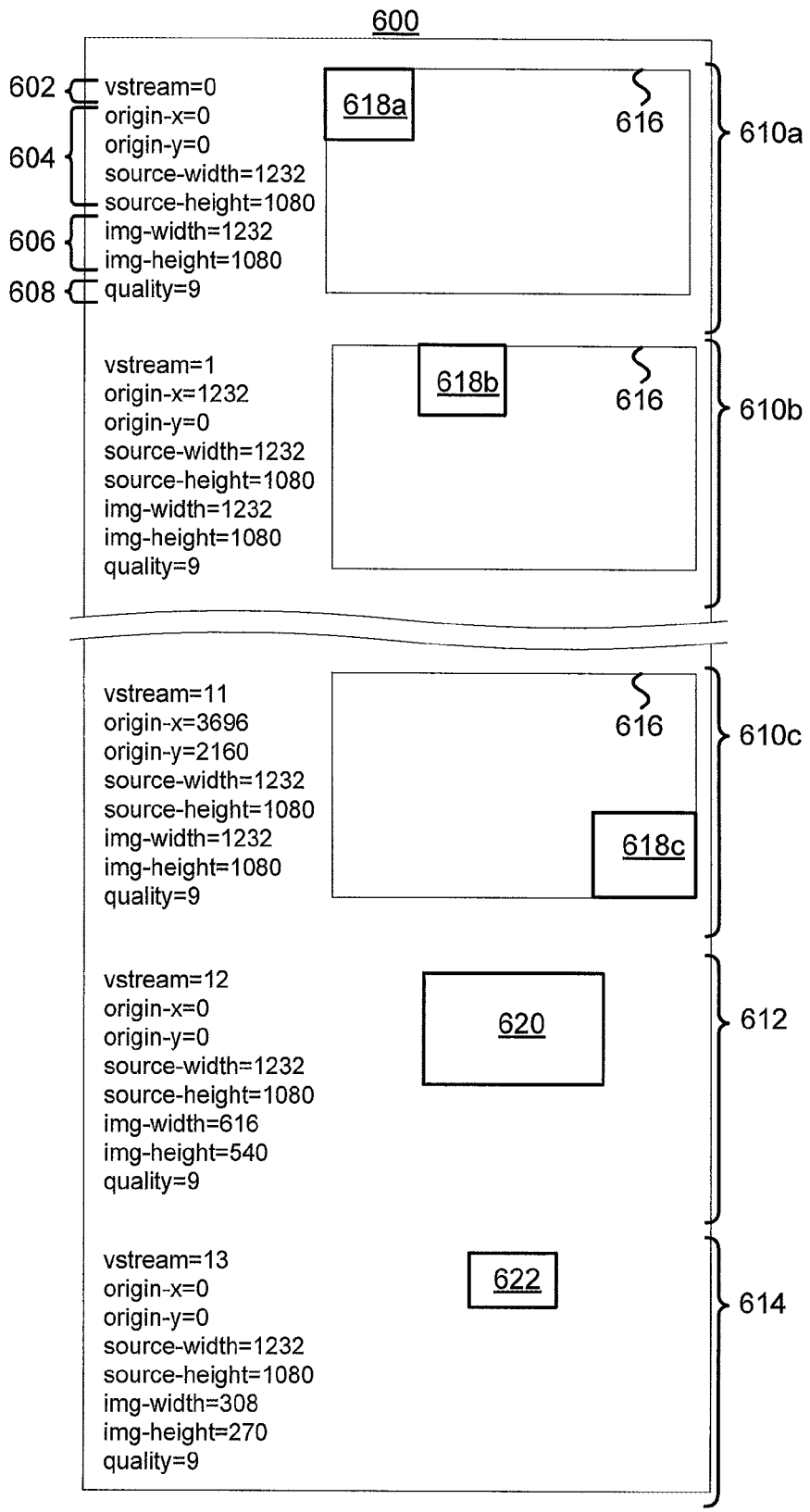
FIG. 6 depicts an example video source device response that describes individual virtual streams comprised in multiple resolution encodings.

FIG. 6 depicts a response from the video source device 316 describing individual virtual streams that provide the multiple resolution encodings, and is a particular example of the session description information/file 509. The response 600 may describe the stream that will be provided from the video source device 316. The response 600 describes each of the virtual streams in the video stream. The video stream may have a number of individual virtual streams 610a, 610b, 610c, 612, and 614. The encoding parameters of each virtual stream are provided. For example, each virtual stream may include a unique identifier 602 of the virtual stream, the area or region of interest 604 of the video source encoded by the virtual stream, a resultant resolution 606 of the encoded virtual stream as well as an indication of the quality of the encoded virtual stream 608. As depicted schematically, virtual streams may encode different regions of interest at the same encoder settings. For example, virtual streams 610a, 610b, 610c encode different regions of interest of the source video at the same encoder settings. Further, virtual streams may encode the same region of interest at different parameter settings. For example virtual streams 612 and 614 encode the same region of interest but result in different resolutions. The description 600 of the stream may be provided in various formats and provides sufficient information in order to allow a component that receives the stream, such as control server, to properly demultiplex and identify the component virtual streams.

Figure 7:
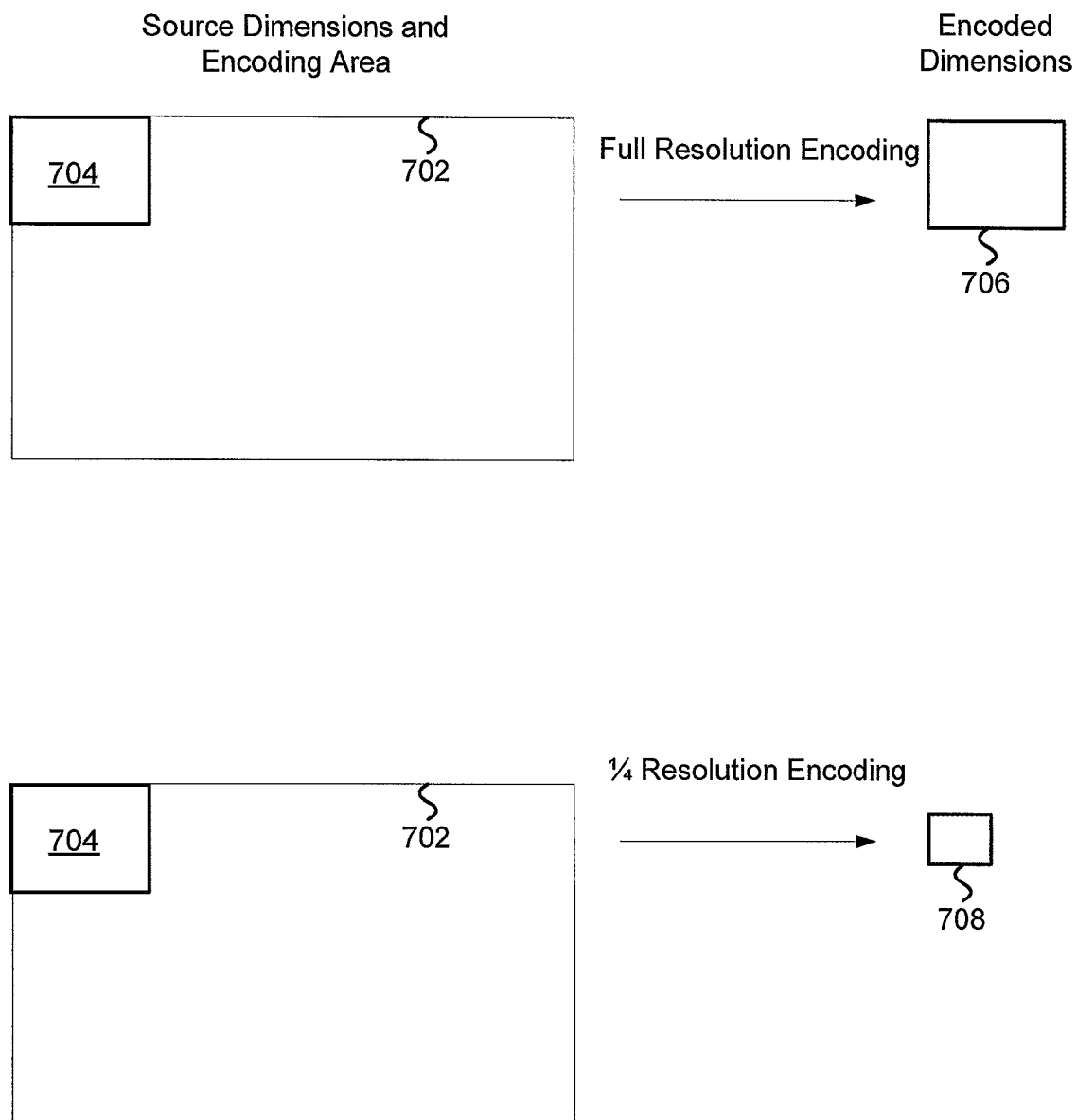
FIG. 7 depicts an illustration of an example encoding of a region of interest at different resolutions.

FIG. 7 depicts the encoding of a tile at different resolutions. A virtual stream may encode a particular area of the video source to a particular size. For example, the source video may have an area 702 of 4944×3280. A first virtual stream may encode a portion 704 of the total area located at x=0, y=0, that is the top left of the source video, and having dimensions 1232×1080. The first virtual stream may provide a full resolution encoding of the area 704, which will result in the first virtual stream encoding 706 having dimensions 1232×1080. A second virtual stream may encode the same area 704. However, the encoding may down sample the resolution in order to provide ¼ of the source resolution. As such, the second virtual stream 708, which encodes the same source video area 704, will have dimensions of 308×270.

Figure 8:
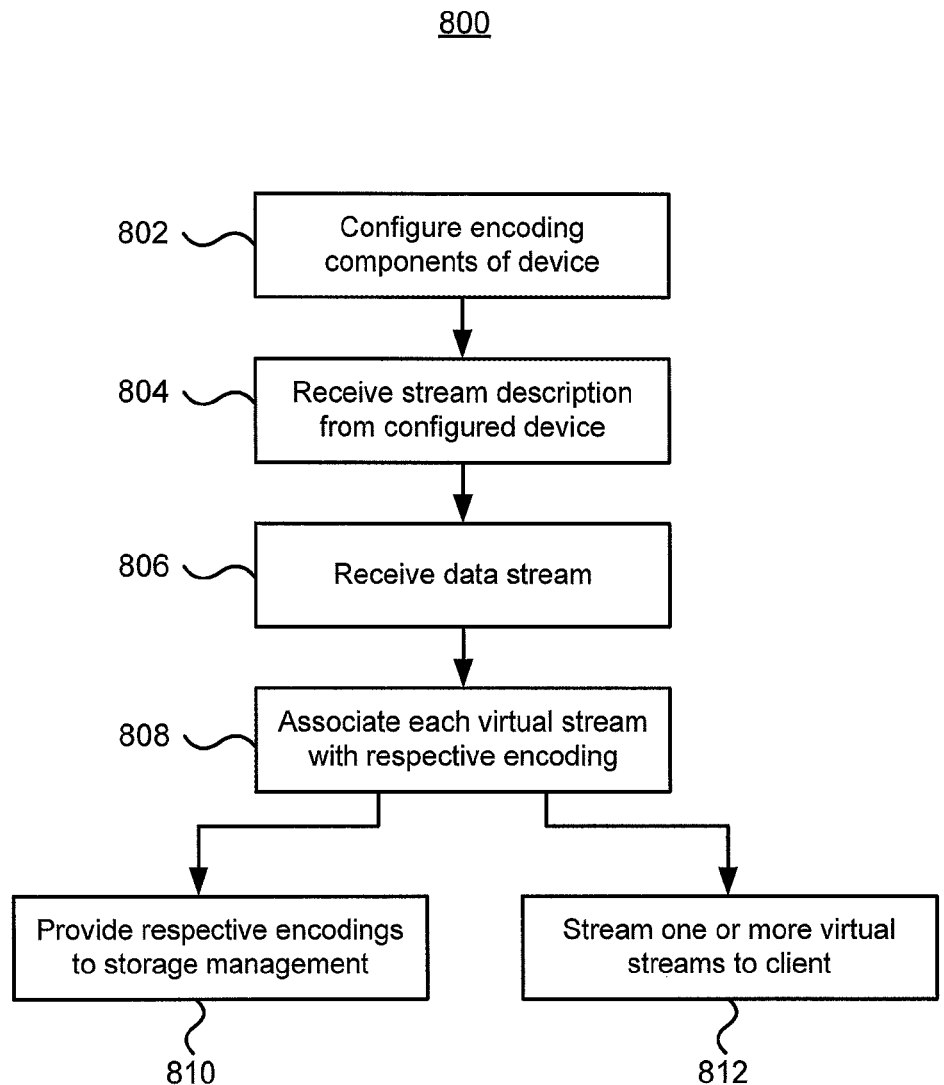
FIG. 8 depicts a flow diagram of an example method for streaming data from a video source device.

FIG. 8 depicts a method 800 of streaming data from a video source device 316 to a control server 302. At block 802, encoding components of a video source device are configured. The configuring operation may comprise transmitting one or more configuration commands from, for example, control server 302 to one or more video source devices 316 which may comprise encoders 114. The encoding components of the video source device 316 are configured in order to provide a number of virtual streams within the stream sent from the video source device 316. The encoding components may be configured in order to provide independent resolution encodings of at least a portion of a source video. At least one of the independent resolution encodings is provided by a plurality of virtual streams each of which comprises a tile of a mosaic of the resolution encoding. An encoding component comprised in video source device 316 may be configured to provide each virtual stream.

Once the encoding components for a stream are configured, at block 804, a description of the stream such as is described above in connection with FIG. 5A (reference number 509) and FIG. 6 (reference number 600) is communicated from the video source device 316 to the control server 302. In an example embodiment, the stream description 509 may be provided by the video source device 316 to the control server 302 in response to a description request sent by the control server 302. The received description 509 describes the plurality of individual streams the video source device 316 is configured to provide. Each of a desired resolution encoding may be provided by one or more virtual streams described in the description 509. The description 509 of each virtual stream may include an identifier of the virtual stream as well as encoding information of the virtual stream and an indication of the area of the source video that is encoded by the virtual stream.

At block 806, the data stream itself is communicated from video source device 316 and received at control server 302. At block 808, the control server 302 associates each virtual stream with a respective resolution encoding. Identifying which of the virtual streams is associated with the respective resolution encodings may be done using the information in the stream description 509. Additionally, if multiple virtual streams encode the same area of the source video, it may be necessary to utilize additional information encoded in the virtual stream in order to determine which resolution encoding the virtual stream is associated with. Once the respective resolution encoding is associated with each virtual stream, the virtual streams of the same resolution encodings may be further processed. For example, at block 810, the virtual streams of each resolution encoding may be provided for storage. The virtual streams and the stream description 509 may be stored in relation to each other. Additionally or alternatively, at block 812, one or more of the virtual streams of a resolution encoding may be streamed to one or more monitoring clients. It will be appreciated that while in the above description it is implied that a number of virtual streams are processed before the individual virtual streams are stored and/or transmitted to a client, each of the virtual steams is independently decodable and may be immediately stored and/or sent to a client.

The above has described encoding different regions of interest of a source video. The different encoded regions of interest may encode the entire source video or may encode only a portion of the source video. When switching between the encoded regions of interest that are displayed, or when multiple regions of interest are displayed at the same time, either next to each other in order to provide a mosaic of the source video, or superimposed on top of each other, any discrepancies between the synchronization of the displayed encodings may be apparent to the viewer. Such a lack of synchronization provides an undesirable user experience. As described further below with reference to FIGS. 9 and 10, it is possible to encode and multiplex the regions of interest together in order to maintain synchronization between the multiple virtual streams.

Figure 9:
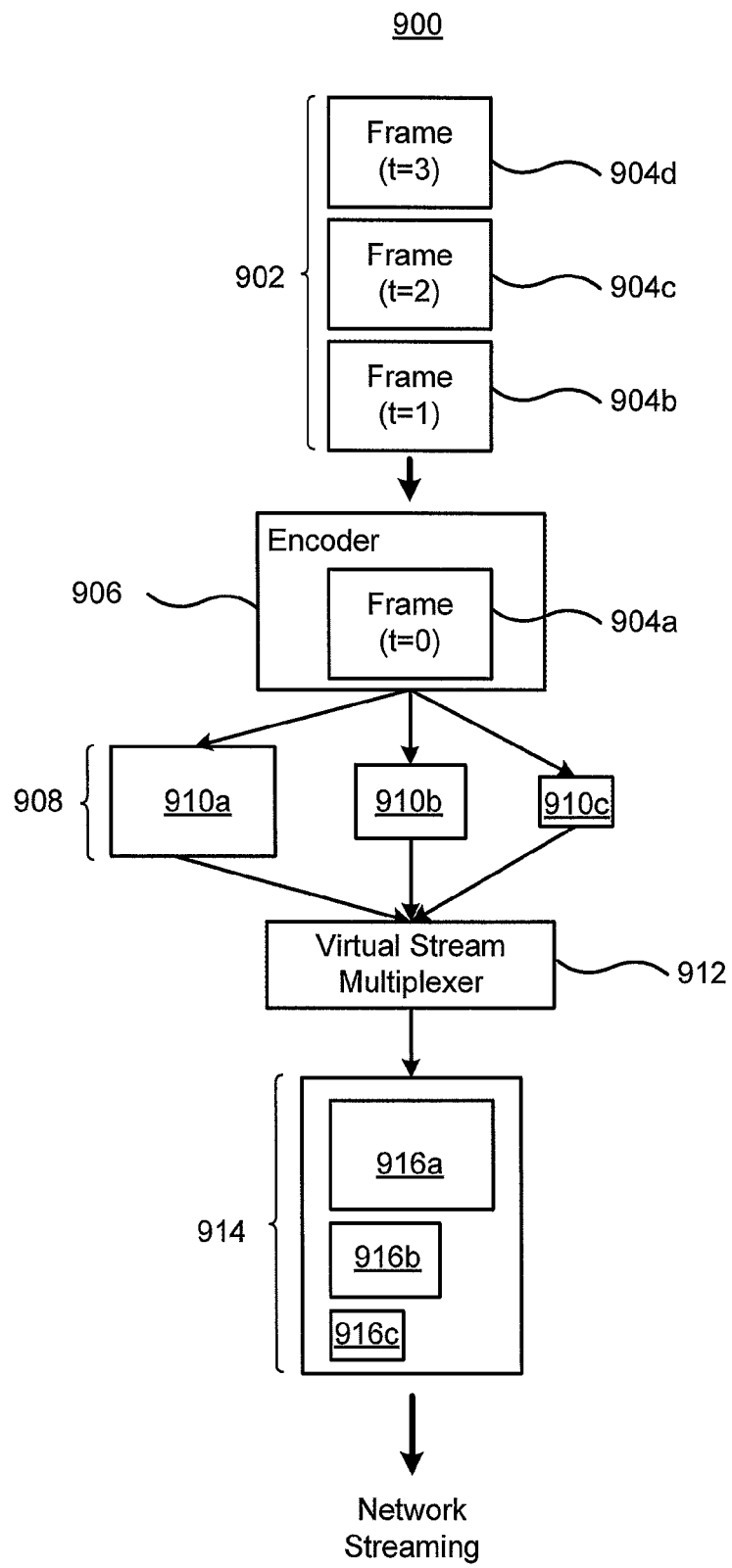
FIG. 9 depicts a flow diagram of an example process for encoding a source video.

FIG. 9 depicts schematically a process for encoding multiple regions of interest. The process 900 encodes a stream of source video 902 that comprises a number of source frames 904*a*-*d* (referred to collectively as source frames 904). The number of source frames 904 may vary depending upon the frame rate of the video source. For example, a video source stream may comprise 30 frames per second. The frame rate of a video source stream may be higher or lower than 30 frames per second. Each of the source frames comprises a source frame timestamp (not shown) that identifies, for example, the UTC of when the source frame was generated.

One or more encoders 906 are configured in order to encode each of the video source frames 904 into a plurality of encoded virtual frames 908. As depicted in FIG. 9, the first video source frame 904*a* is encoded into a high resolution encoding 910*a*, a medium resolution encoding 910*b* and a low resolution encoding 910*c*. Although depicted as each encoding the entire video source frame 904*a*, each of the different encoded virtual frames may encode different regions of interest of the video source frame. Further, although the encoded virtual frames 908 are described as being encoded at different resolutions than the source video frame 904*a*, it is contemplated that the encoded virtual frames may be encoded at the same resolution, but may differ in other encoding parameters, such as the encoding format, frame rate, and video quality. The encoder 906 may encode each of the virtual frames 908 in a round-robin manner. Additionally or alternatively, one or more encoders may be configured to encode the different virtual frames. If multiple encoders are used, it may be necessary to provide a mechanism to track which encoded virtual frames correspond to the same video source frame. This may be accomplished by tagging each of the encoded virtual frames with a common identifier. Additionally or alternatively, the input and output of each encoder may be tracked in order to determine which video source frame an output encoded virtual frame corresponds with. Each of the virtual frames at this stage of the process 900 comprises a virtual frame header that includes a virtual frame timestamp derived from the source frame timestamp.

Once the video source frame has been encoded into the plurality of virtual frames, each of the encoded virtual frames corresponding to the same video source frame are multiplexed together by a virtual stream multiplexer 912. The virtual stream multiplexer 912 multiplexes the plurality of encoded virtual frames 910*a*, 910*b*, 910*c* into a single container frame 914, which may be transmitted over the network, for example to a control server 302. The multiplexing is done by concatenating the virtual frames together, with each virtual frame having a virtual frame header that delimits the virtual frames and the container frame having a container frame header that delimits container frames from each other. Although only video streams are depicted as being multiplexed into the frame container 914, it is contemplated that other data may be included such as audio data, analysis data, and metadata information. The container frame 914 comprises a container frame header, which includes a container frame timestamp derived from the virtual frame timestamps. Each of the virtual frame headers comprises a vstream id that identifies that particular virtual frame, as discussed in more detail above with respect to FIGS. 5A and 5B.

By multiplexing all encoded virtual frames corresponding to the same video source frame into a common container frame, it is possible to maintain complete synchronization of the individual virtual streams. Accordingly, it is possible to display multiple encoded regions of interest at the same time without any discrepancy in the synchronization, which may provide an improved user experience.

Figure 10:
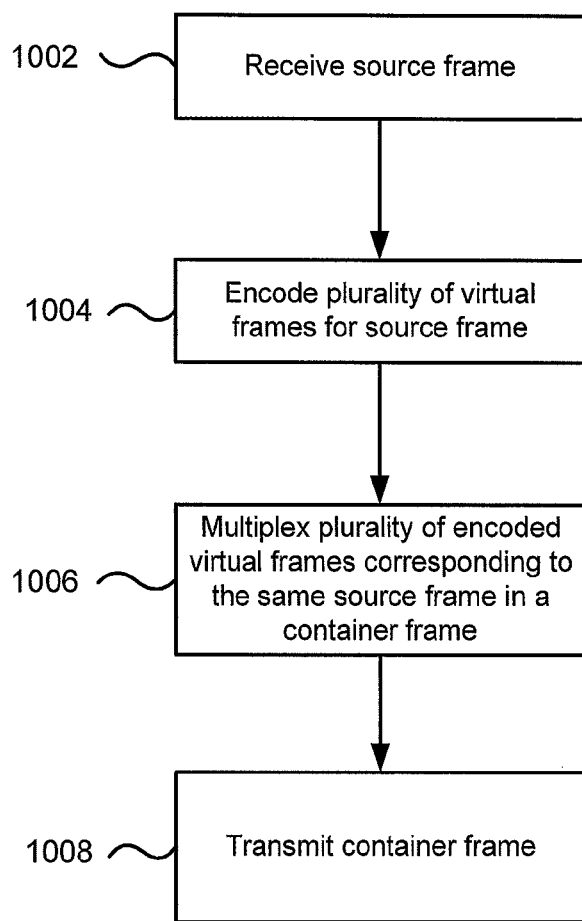
FIG. 10 depicts a flow diagram of an example method for encoding a source video.

FIG. 10 depicts a method 1000 for encoding a source video. At block 1002, a video source device 110 receives a source frame from a video source stream that is being encoded. At block 1004, one or more encoders encode a plurality of virtual frames of the source frame. Each virtual frame may be encoded using different parameters, including the region of the source frame being encoded, a frame rate of the encoding, a quality of the encoding, a resolution of the encoded virtual frame, a compression technique/encoding format used as well as other encoding parameters. At block 1006, video source device 110 and/or encoder 114 multiplex the plurality of encoded virtual frames into a container frame. The container frame multiplexes all of the virtual frames together that were encoded from the same source frame. If two or more virtual streams are encoded at different frame rates, each container frame of the container stream may not include each virtual frame. For example, if one virtual stream is encoded at 30 virtual frames per second (fps) while another virtual stream is encoded at 15 virtual frames per second, every container frame will include a virtual frame of the 30 fps encoding, while only every second container frame will include both the 30 fps encoding and the 15 fps encoding. Alternatively, the frames of the 15 fps encoding may be duplicated to be included in each container frame. Further, two or more different frame rates are encoded that are not multiples of each other, the frame rate of the container stream may be increased to the lowest common denominator of all of the encoded frame rates. For example, if one virtual stream is encoded at 20 fps and a second virtual stream is encoded at 30 fps, the container stream frame rate may be 60 fps. Once the virtual frames are multiplexed together in the container frame, at block 1008, the container frame may be transmitted to a desired destination, such as the control server described above.

Server and Client Interaction

Figure 11:
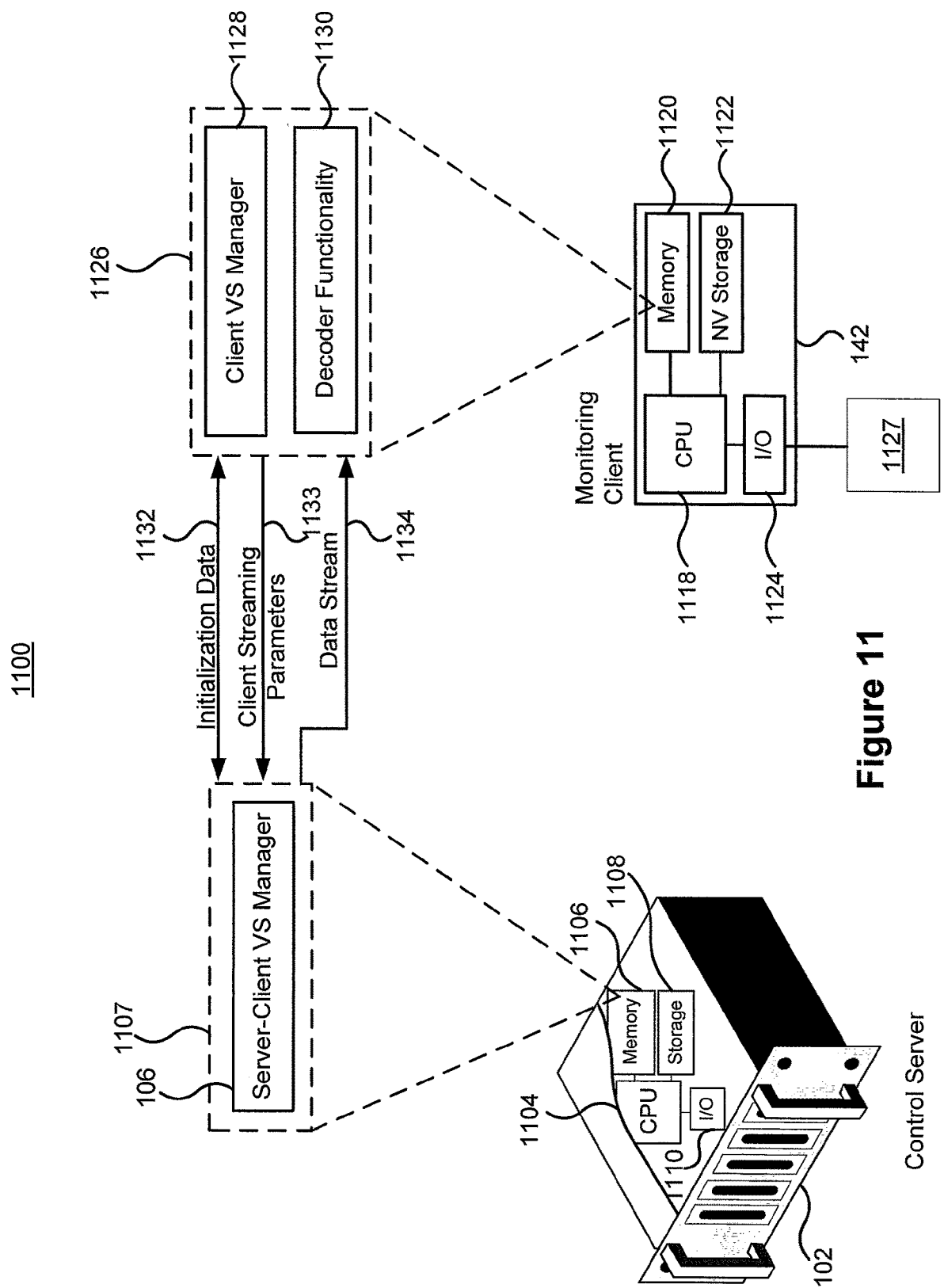
FIG. 11 depicts example functional features provided by a control server and client.

FIG. 11 depicts a system 1100 for streaming multiple encodings to the client 142. The system 1100 comprises the control server 102 and the client 142. The control server 102 comprises a central processing unit 1104 for processing instructions. The instructions may be stored in memory 1106. The control server 102 may further comprise non-volatile storage 1108 for persistent storage of data and instructions. The control server 102 may further comprise one or more input/output (I/O) interfaces 1110. The I/O interfaces allow input and/or output components to be connected to the control server 102. For example, a network interface card (NIC) may be connected to the control server 102 in order to connect the control server 102 to a communication network.

The CPU 1104 may execute instructions stored in memory. The instructions, depicted as 1107, when executed may configure the control server 102 to provide the server-client VS manager 106, along with other functionality described above. As discussed in further detail below, the server-client VS manager 106 enables the control server 102 to stream multiple resolution encodings to the client 142.

The client 142 comprises a central processing unit 1118 for processing instructions. The instructions may be stored in memory 1120. The client 142 may further comprise non-volatile storage 1122 for persistent storage of data and instructions. The client 142 may further comprise one or more input/output (I/O) interfaces 1124. The I/O interfaces allow input and/or output components to be connected to the CPU 1118 to permit the streams the client 142 receives from the server 102 to be displayed; in the depicted embodiment, a monitor 1127 is connected to one of the I/O interfaces 1124 for this purpose.

The CPU 1118 may execute instructions stored in the memory 1120. The instructions, depicted as 1126, when executed may configure the client 142 to provide the client VS manager 1128 as well as decoder functionality 1130.

The client management functionality 106 of the control server 102 and the client VS manager 1128 of the client 142 cooperate in order to configure streaming from the control server 102 to the client 142 as desired or required by exchanging initialization data 1132 and by the client 142 sending to the control server 102 client streaming parameters 1133. The decoder functionality 1130 may be configured in order to provide multiple decoding components that can each decode video and specified settings, which may include a number of rows and columns of individually encoded tiles. The encoded streams stored using or being relayed through the control server 102 can be streamed to the client 142 as depicted as data stream 1134.

Figure 12:
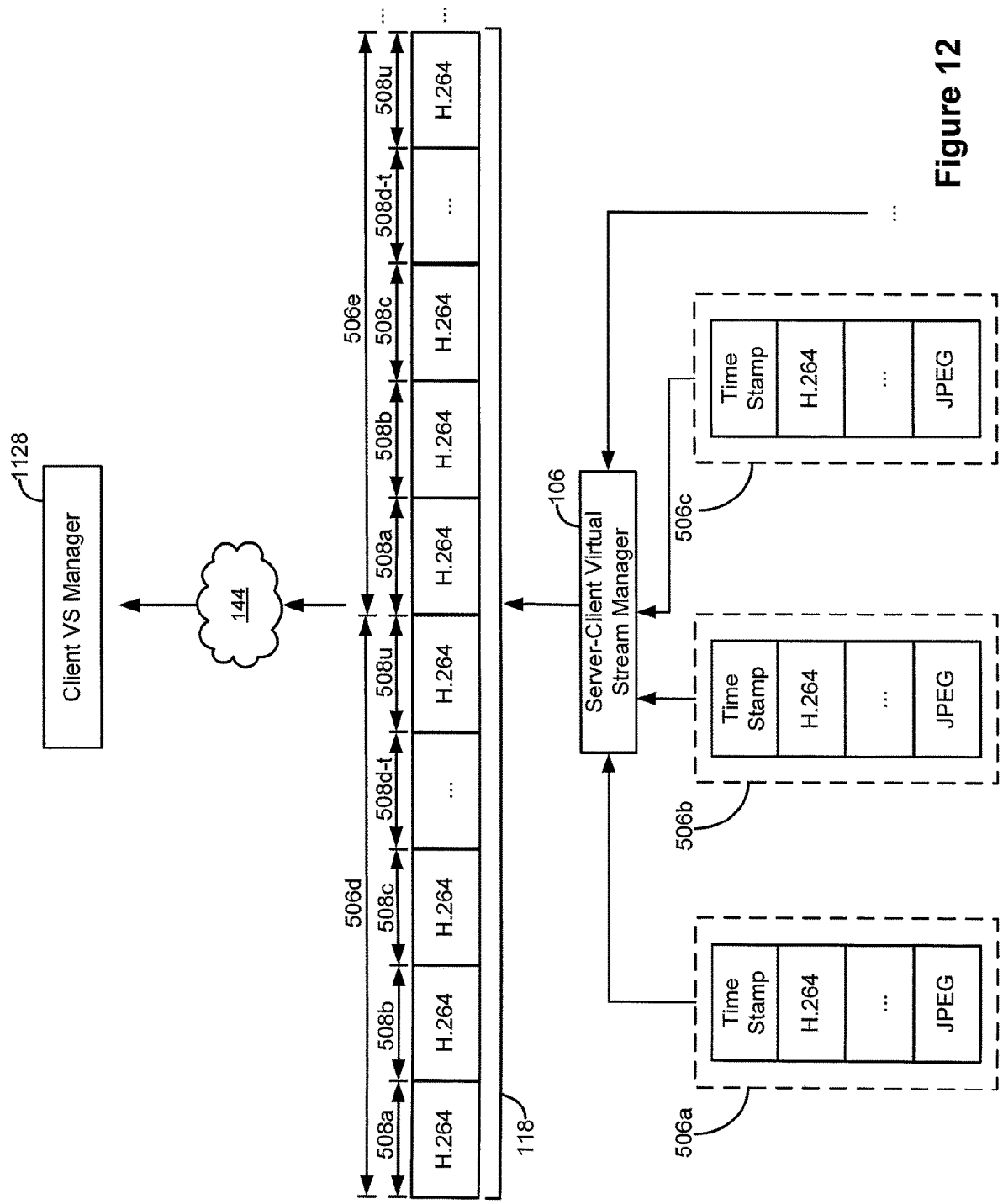
FIG. 12 depicts an example video stream comprising container frames being multiplexed by the control server and sent to the client.

Referring now to FIG. 12, there is shown a video stream 118 that the server-client VS manager 106 generates by multiplexing multiple container frames 506 and which the server-client VS manager 106 then sends to the client VS manager 1128. As discussed above in connection with FIG. 5B, each of the virtual frames 508 comprised in any one of the container frames 506 comprises a virtual frame header with a delimiter to delimit between the virtual frames. The container frames 506 also each comprise a timestamp 508 applicable to all the virtual frames 508 in that container frame. In FIG. 12, the container frames 506 that the server-client VS manager 106 accesses can be obtained from one or both of the data store 132 and the video source devices. In the example scenario depicted in FIG. 12, the server-client VS manager 106 has determined that only the H.264 virtual stream is to be transmitted to the client 142; consequently, each of the container frames 506 sent to the client VS manager 1128 comprises the H.264 virtual stream and not the JPEG stream. Once the client VS manager 1128 receives the video stream 118, it demultiplexes it and displays or stores the virtual streams in a manner analogous to that performed by the server-device VS manager as described above in connection with FIG. 5B. The client 142 may, for example, stitch together various virtual streams to form a larger image or permit virtual streams to overlap each other, as discussed in further detail below.

Prior to receiving the video stream 118, however, the client 142 requests the video stream 118 from the control server 102. The manner in which the client 142 requests the video stream 118, and in which the control server 102 selects the virtual streams to send to the client, is described below in connection with FIGS. 13 and 15.

Figure 13:
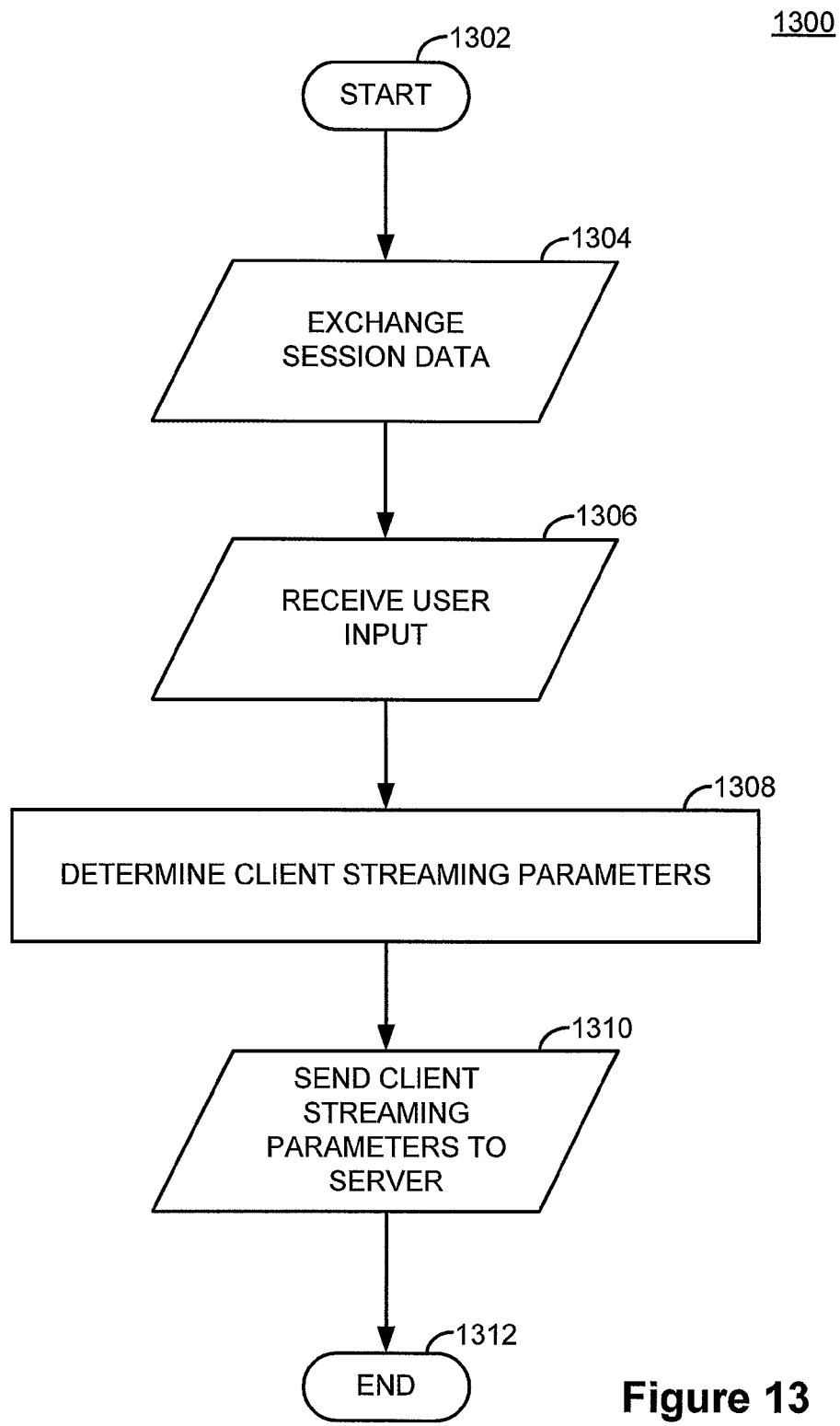
FIG. 13 depicts an example method for transmitting client streaming parameters from the client to the control server.

Referring now to FIG. 13, there is shown a method 1300 for transmitting client streaming parameters 1133 from the client 142 to the control server 102. Client streaming parameters 1133 are parameters that the control server 102 considers when determining which of the virtual streams to send to the client 142 for display on the monitor 1127. Instructions for performing the method 1300 may be encoded as program code and stored on the memory 1120 for execution by the CPU 1118.

The CPU 1118 begins performing the method 1300 at block 1302, and proceeds to block 1304 where it establishes a session with the control server 102 in a manner analogous to how the control server 102 and video source devices establish a session as described above in respect of FIGS. 1 to 10. As part of establishing a session, the initialization data 1132 sent from the control server 102 to the client 142 comprises the session information, which describes encoding parameters, one or both of resolution and pixel count, and position of each of the virtual streams 126,128,130. As discussed in further detail below, in one example embodiment, the client 142 may present this information about the virtual streams 126,128,130 to the user to permit the user to specify which of the virtual streams 126,128,130 to display.

After initialization, the CPU 1118 receives user input describing, explicitly or implicitly, which of the virtual streams 126,128,130 to display. This user input may include:

(a) Viewing areas. The viewing area is the number of pixels in a window on the monitor 1127, 150 that the user uses to view video and is typically expressed as a number of pixels. For example, in FIG. 1 the client 142 uses the entire monitor 150 to show video from four virtual streams. The viewing area for each of the streams is accordingly the total number of pixels for the entire monitor divided by 2 to the power of the quality bias parameter, which is described below.

(b) Image regions. The image region/region of interest represents a portion of an image that the user wants to be displayed on the monitor 1127, 150. An image region may be specified by providing the coordinates of the top left and bottom right coordinates of the image region. For example, the user may draw a rectangle on a portion of an image displayed on the monitor using a mouse or other pointing device when attempting to zoom into a portion of the image. The rectangle would represent the image region.

(c) Display quality bias parameter. The display quality bias parameter represents whether the user would prefer high quality, which is a proxy for a high pixel count, at the cost of a low frame rate, which is measured in frames per second. This parameter may be intuitively set to "high", "medium", or "low" quality, with "high quality" representing the user's desire to sacrifice frame rate for a high pixel count, and "low" quality representing the user's desire for a high frame rate but low pixel count/resolution.

(d) Chromatic specification parameter. The chromatic specification parameter represents whether the user wants to view the video in color or monochrome.

(e) Bandwidth limit parameter. The bandwidth limit parameter represents whether the user wants to cap total bandwidth usage at a certain rate, as measured in bits per second. The user may decide to not specify any hard limit on bandwidth.

(f) Nature and use of video. The user can specify whether the video to be viewed is to be retrieved from storage (i.e., streamed from the data store 132) or viewed live, and whether the video is being used to control a piece of hardware such as a pan-tilt-zoom (PTZ) camera. If the video is to be streamed from the data store 132, then latency is relatively unimportant and video with a relatively high pixel count or frame rate may be transmitted at the cost of a relatively high latency. In contrast, if video is live or is being used to control hardware, then low latency is important in order to get images in real-time. In this case, a low latency is prioritized over high quality video.

(g) Which of the virtual streams 126, 128, 130 to display. In embodiments in which the user knows which of the virtual streams are available, the user may manually and directly specify particular virtual streams to view as opposed to indirectly selecting virtual streams by adjusting the criteria listed above.

The user may also indirectly select which of the virtual streams to display. For example, the user may select one or more ROIs and/or one or more resolutions of the source video, and each ROI and resolution may correspond to a particular virtual stream. In FIG. 2, for example, by selecting as a region of interest the portion 216 of FIG. 2 shown in dashed lines, the user implicitly selects virtual streams $A_{1,3}$ and $A_{1,4}$ for transmission. As another example, the user may be viewing only virtual streams $A_{1,3}$ and $A_{1,4}$ and then quickly zoom out so that the ROI becomes the entire resolution of the source video. This may implicitly be construed as the user requesting a low resolution virtual stream 130 of the entire source video for interim display until the high resolution virtual streams 126 can be sent from the server to the client.

After receiving the user input at block 1306, the CPU 1118 determines the client streaming parameters 1133. The client streaming parameters 1133 comprise all of the types of user input listed above, and further comprise parameters that the CPU 1118 generates itself. Data that the CPU 1118 generates itself includes packet loss statistics, which are indicative of network congestion, current usage statistics for the CPU 1118 and the memory 1120, which are indicative of the resources available to decode video that has high frame rates or high pixel counts or both, and a suggested virtual stream list. While the CPU 1118 may not present the list of available virtual streams directly to the user, the CPU 1118 has access to that list and to the location and size of the tiles represented by the virtual streams because it has the response 600. Consequently, the CPU 1118 can determine which of the virtual streams the client 142 is best suited to display.

For example, and referring again to FIG. 2, the user may be viewing the medium resolution encoding 214 and then zoom in to a particular image region, which is the portion 216 in FIG. 2 shown in dashed lines. The CPU 1118 maps the portion 216 to virtual streams $A_{1,3}$ and $A_{1,4}$, which display the portion 216 in greater detail (i.e. using more pixels) than the medium resolution encoding 214, and in FIG. 2 the client 142 then displays virtual streams $A_{1,3}$ and $A_{1,4}$. In another embodiment, however, the CPU 1118 considers image region as only one of several factors to be considered, and may also consider, for example, current CPU 1118 usage and the nature and use of the video. If CPU 1118 usage is too high to support real-time decoding of the relatively high resolution virtual streams $A_{1,3}$ and $A_{1,4}$ and the video is a live stream where low latency is important, the CPU 1118 may suggest that the medium resolution encoding 214 continue to be used, or even that the low resolution stream 130 be used in order to ensure that the video can be sufficiently quickly decoded to permit low latency. As discussed above, while the present example distinguishes between virtual streams based on resolution, in alternative embodiments the virtual streams may be differently distinguished; they may, for example, be distinguished based on any one or more of region of interest, frame rate, resolution, quantization quality, bitrate, and encoding format. As the container frame 506 is an extensible format, other distinguishing characteristics may be used in the future, such as whether motion or a person's face is detected. The format of the container frame 506 can be changed without prejudicing backwards compatibility since virtual stream managers or other parsers of the container frames 506 can be designed to ignore unknown attributes or data fields.

After the CPU 1118 determines the client streaming parameters 1133 at block 1308, it proceeds to block 1310 and sends those parameters 1133 to the control server 102. The CPU 1118 then proceeds to block 1312 where the method 1300 ends and the CPU 1118, accordingly, waits for the control server 102 to send the data stream 1134.

Figure 14:
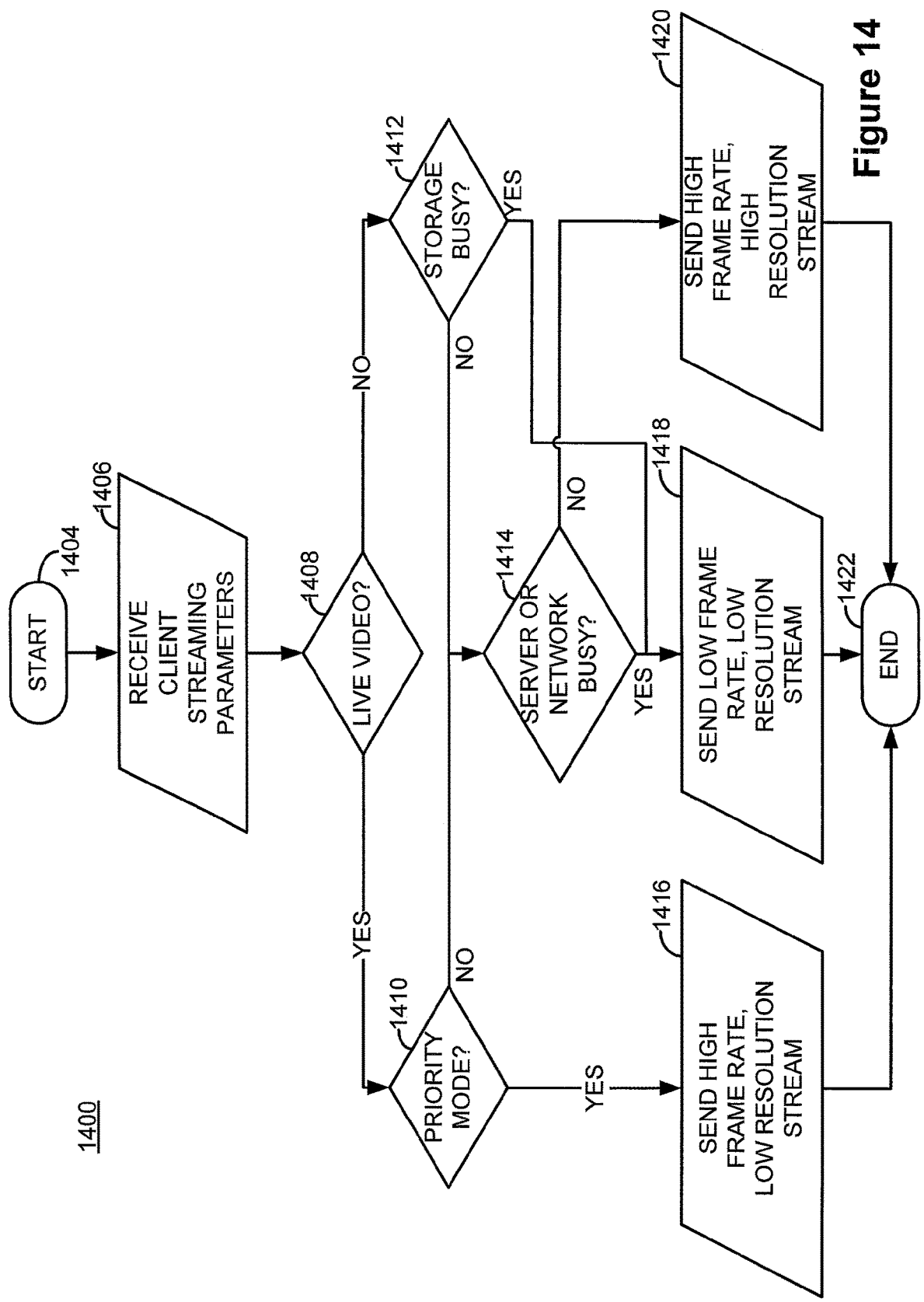
FIG. 14 depicts an example method for transmitting a data stream comprising container frames from the control server to the client.

Referring now to FIG. 14, there is shown a method 1400 for transmitting a data stream comprising video data from the control server 102 to the client 142. Instructions for performing the method 1400 may be encoded as program code and stored on the memory 1106 for execution by the CPU 1104. In the method 1400 of FIG. 14, the control server 102 has access to three different virtual streams: a first stream encoded to have a high frame rate but low resolution (moderate quality), a second stream encoded to have a low frame rate and low resolution (low quality), and a third stream encoded to have a high frame rate and high resolution (high quality). For example, the high quality stream could be 2 MP at 30 images per second (ips), the moderate quality stream could be at 0.08 MP at 30 ips, and the low quality stream could be at 0.08 MP at 5 ips. This example may be used when high resolution views of different regions of interest are not required, so the flexibility of the container frame 506 is used to provide alternative frame rate video streams.

The CPU 1104 begins performing the method 1400 at block 1404, and proceeds to block 1406 where it receives the client streaming parameters 1133 from the client 142, which the client 142 generates and sends as described with respect to FIG. 6. The CPU 1104 proceeds to block 1408 and, from the client parameters 1133, determines whether the video data that the client 142 is requesting comprises live video or not. If the requested data comprises live video data, the CPU 1104 proceeds to block 1410 where it determines from the client parameters 1133 whether the data is being used in a latency-sensitive application, such as controlling movement of a PTZ camera. If yes, the client 142 is deemed to be in a "priority mode" in which frame rate is prioritized over resolution, and the CPU 1104 proceeds to block 1416 where it sends one or more high frame rate, low resolution virtual streams to the client 142. After sending the one or more streams, the CPU 1104 proceeds to block 1422 where the method 1400 ends.

If the client 142 is not requesting live video, then the CPU 1104 proceeds to block 1412, instead of to block 1410, from block 1408. At block 1408, the CPU 1104 determines whether the data store 132 is too busy to send high frame rate, high resolution streams. If the data store 132 is too busy to do this, the CPU 1104 proceeds to block 1418 where it sends one or more low frame rate, low resolution virtual streams to the client 142. The method by which the CPU 1104 selects a particular stream is described in more detail with respect to FIG. 15 below. After sending the one or more streams, the CPU 1104 proceeds to block 1422 and the method 1400 ends.

If the client 142 has requested live video but is not deemed to be in priority mode, or if the client 142 has requested video stored in the data store 132 and the data store 132 has capacity to send high frame rate, high resolution streams, the CPU 1104 proceeds to block 1414 where it determines whether one or both of the control server 142 and the network 144 is too busy to send high frame rate, high resolution streams by, for example, determining CPU 1104 utilization and determining whether the network 144 is congested, respectively. If one or both of the control server 102 and network 144 is too busy to send high frame rate, high resolution streams, the CPU 1104 proceeds to block 1418 where it sends low frame rate, low resolution streams to the client 142. The CPU 1104 otherwise proceeds to block 1420 where it sends high frame rate, high resolution streams to the client 142. The method by which the CPU 1104 selects a particular stream is described in more detail with respect to FIG. 15 below. After sending the one or more streams, the CPU 1104 proceeds to block 1422 and the method 1400 ends.

Figure 15:
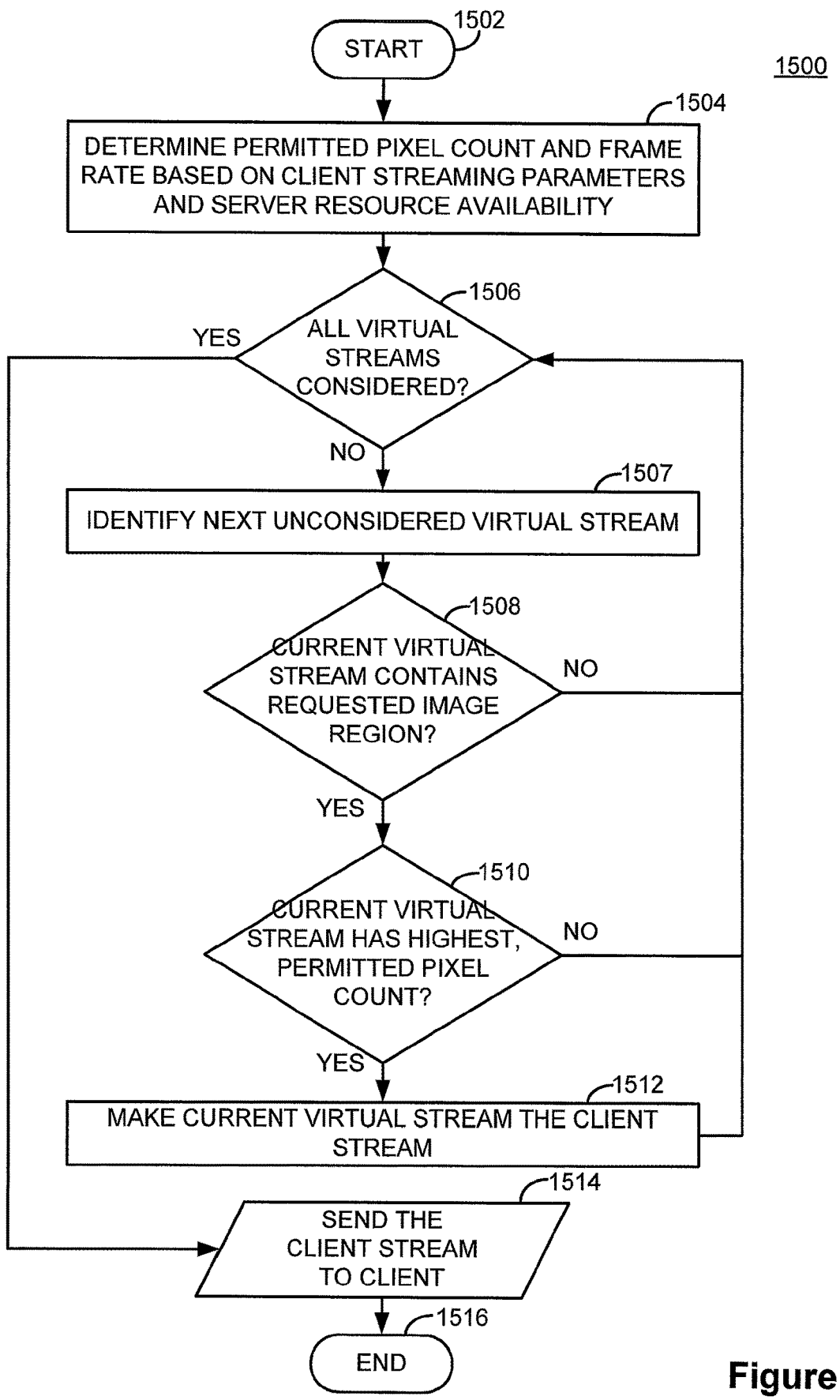
FIG. 15 depicts an example method for determining which of several virtual streams to multiplex and send from the control server to the client.

Referring now to FIG. 15, there is shown a method 1500 for determining which of several virtual streams to send from the control server 102 to the client 142. Instructions for performing the method 1500 may be encoded as program code and stored on the memory 1106 for execution by the CPU 1104. To provide context to the method 1500 of FIG. 15, the 14 virtual streams of FIG. 1 will be considered in conjunction with the method 1500: the full resolution encoding 120 comprising 12 virtual streams, each representing a different image region, encoded at 1.3 Megapixels, with all 12 regions collectively comprising the region of interest and encoded at 30 fps; the medium resolution encoding 122 comprising a single virtual stream representing the entire region of interest encoded at 2 Megapixels and 30 fps; and the low resolution encoding 124 comprising a single virtual stream encoded at 0.077 Megapixels (QVGA) and 15 fps.

The CPU 1104 begins performing the method 1500 at block 1502 and proceeds to block 1504 where it determines a permitted pixel count and frame rate based on the client streaming parameters 1133 and server resource availability, which in the present example embodiment comprises availability of the CPU 1104, the data store 132, and the network 144.

After determining the permitted pixel count, which in this context is a proxy for video resolution, and frame rate at block 1504, the CPU 1104 proceeds to block 1506 where it begins to determine which of the virtual streams is best suited for sending to the client 142. At block 1506 the CPU 1104 determines whether it has analyzed all 14 of the virtual streams to determine their suitability for sending to the client 142; if no, the CPU 1104 proceeds to block 1507 where it identifies one of the remaining, unconsidered virtual streams, which for blocks 1508 to 1512 is referred to as the "current virtual stream". The CPU 1104 then proceeds to block 1508 where it determines whether the current virtual stream contains the requested image region. If, using FIG. 2 as an example, the client streaming parameters 1133 indicate that the user has selected the dashed rectangle shown in FIG. 2, the only virtual streams for which the CPU 1104 would return "yes" are streams $A_{1,3}$, $A_{1,4}$, B1, and C1. Because streams $A_{1,3}$ and $A_{1,4}$ need to both be sent to the client 142 in order to display the selected image region and to satisfy the client streaming parameters 1133, the CPU 1104 considers streams $A_{1,3}$ and $A_{1,4}$ to be a single virtual stream for the purposes of blocks 1506 to 1514.

The CPU 1104 then proceeds to block 1510 where it determines whether the current virtual stream has the highest, permitted pixel count compared to any previously considered virtual streams. In the example with the 14 virtual streams above, the permitted pixel count is 15.6 Megapixels/$4^2$=0.975 Megapixels; accordingly, the only virtual stream that satisfies the criterion of block 1510 is stream C1. At block 1512, the CPU 1104 sets stream C1 to be the "client stream", which is the one of the considered streams to that point in execution of the method 1500 that has satisfied the criteria of blocks 1508 and 1510 and that is earmarked to be transmitted to the client 142, and then returns to block 1506.

Once the CPU 1104 has considered all of the virtual streams, it proceeds to block 1514 from block 1506 and sends the client stream to the client 142 in accordance with FIG. 9, following which it proceeds to block 1516 where the method 1500 ends.

It will be appreciated that the processing described in connection with FIG. 15 is illustrative of processing performed by control server 102 in determining encodings for transmission to a client system 142. While the example described in connection with FIG. 15 references identifying a stream with a highest pixel account, the client parameters may specify other characteristics for encodings to be transmitted to a client system 142. For example, the client parameters may specify receiving a plurality of different encodings with a range of characteristics. In an example scenario, the client parameters may specify receiving encodings relating to several regions of interest. The parameters may specify a first region of interest of a recorded frame and a second region of interest within the recorded frame, where each of the first and second regions of interest represent a subset of the entire viewable area. The parameters may specify that the first and second regions of interest may be overlapping, non-overlapping, or have any other relative relationship. In an example scenario, the parameters may further specify a third region of interest which includes the entire viewable area including the areas of the first region of interest and the second region of interest.

Multiple parameters may be combined to specify an encoding. For example, in addition to specifying regions of interest, the parameters may specify that the encodings have particular encoding resolutions. In an example scenario, the parameters may specify, and the server 102 may select for transmission, that an encoding associated with the first region of interest have an encoding resolution with a particular value or within a particular range. Likewise, the parameters may specify, and the server 102 may select for transmission, encodings associated with the second region of interest that have an encoding resolution with a particular value or within a particular range. Still further, the parameters may specify, and the server 102 may select for transmission, encodings associated with the third region of interest that have an encoding resolution with a particular value or within a particular range. In an example scenario, the parameters may specify that the encodings associated with the first and second regions of interest that correspond to only portions of a display area have a high resolution value, while the encodings corresponding to the third region of interest have a lower resolution relative to the encodings for the first and second regions. In an example scenario, the client parameters may specify, and the server 102 may identify during processing, multiple (first and second) high-resolution non-overlapping regions of interest that intersect a viewing area, and another low row resolution region (i.e., third region) covering the entire source area.

It will be appreciated that a system 102 may employ a plurality of sets of client parameters during the course of processing. For example, server 102 may use a first set of client parameters to identify a plurality of encodings that meet a primary set of criteria. In an example scenario, the first set of client parameters may specify encodings associated with first and second regions of interest and having high resolutions as described above. Server 102 may also use additional or secondary sets of client parameters that specify a different or secondary set of secondary criteria. In an example scenario, secondary client parameters may specify encodings associated with a third region of interest that has a lower resolution as described above. Such a low-resolution full-source region of interest with high encodings may provide resiliency to loss, or hide latency when a region of interest may change quickly by providing data that can be decoded until the server can send higher resolution encodings. Where server 102 identifies and transmits multiple encodings such as, for example, encodings associated with a first, second, and third region of interest as described above, the encodings may be displayed in overlapping or composite manner as described below in connection with FIG. 17. For example, in a scenario wherein two encodings associated with two regions of interest are identified and transmitted to the client system 142, and a third encoding associated with third a region of interest encompassing the first and second regions of interest is identified and transmitted to the client system 142, the first and second encodings may be presented over the third encoding as illustrated in connection with FIG. 17.

Overview of Server-Client Communication

Figure 16:
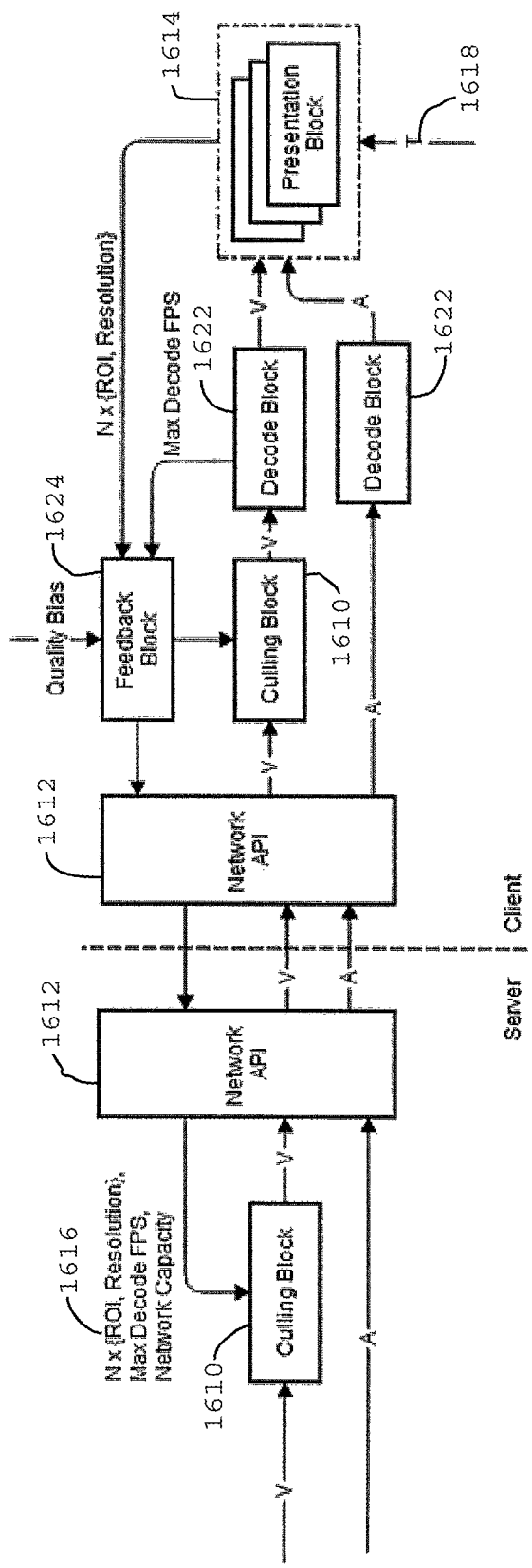
FIG. 16 depicts a block diagram of example client server system adapted for communicating an active session of video from a video source device.

The block diagram of FIG. 16 depicts the video and audio paths, feedback model, and server-client communication for an active session of video from a single video source device. Video in the form of virtual streams is fed forward through a series of culling blocks 1610 that remove information that will not be visible to the user on-screen, or that remove information so that transmission is possible given reserve channel capacity. Audio or other information such as metadata which is associated with the video and has a low data rate relative to the video is generally passed through to the network API block 1612 without modification. It is synchronized with video just before presentation in the presentation block 1614.

A separate feedback path exists that feeds back metrics about decode and network capacity to the culling blocks in addition to information on the regions of interest (ROIs) the user is currently viewing, and resolutions for that session. As a single virtual stream can be displayed on multiple windows, FIG. 16 shows a plurality of ROIs in the feedback path.

FIG. 16 shows the feedback paths for a single session, with a single video and audio source. In general, a number of these sessions can be active at the same time. When they are coupled by a common clock source, (T) 1618, of FIG. 16, they are considered to be synchronized together.

Culling Block

The culling block 1610 takes a list of ROI, width, and height tuples, and other metrics such as decode reserve capacity and network reserve capacity, and executes an admittance algorithm to determine which portions of the video data to remove, or cull.

It is desirable for the culling algorithm to remove information that will not be displayed or exceeds the capacity of the network, or the capacity of the decoder. One possible strategy, given the metrics above, is as follows.

First, we consider a single target ROI and resolution from the list and use this to find the set of virtual streams with the lowest resolution that is just greater or equal to the target resolution while covering the target ROI. Second, a ROI covering any remaining gaps is calculated and used to select from the set of remaining virtual streams the set of highest resolution virtual streams that cover the gap ROI.

This process is repeated with each ROI, resolution pair, and selected virtual streams from each pass being combined into a final list. A final pass is used to remove any redundant virtual streams in the list which are covered by a set of virtual streams of higher resolution.

Once resolution culling has been completed, the output is evaluated to determine if it exceeds either the network reserved bitrate or the decode reserve capacity (using a metric correlated with decode capacity such as Max Decode FPS, total bitrate, or megapixels per second (MP/s)). If either network or decode capacity is exceeded, additional culling can be performed using temporal decimation by dropping whole frames. Additionally or alternatively, the virtual stream resolution cull step can be biased to prefer the selection of lower-resolution virtual streams in order to reduce the total bitrate below the reservation thresholds.

The culling block 1610 on the client-side is similar with one difference being that optimization for downstream network bandwidth is not used. The client-side culling block 1610 adapts at a higher frequency than the server-side block 1610 due to the shorter feedback loop delay in the client.

Network API Block

The network API block 1612 provides the following services: bandwidth reservation, monitoring and feedback; protocol specific packetization; session description; session transport negotiation and establishment; and connection management.

In the system diagram of FIG. 16, the server-side network API block evaluates and provides real-time feedback about the channel capacity which is used as an input to the culling block.

For example, in one example embodiment, the response 600 contains a description of the video stream and an associated audio stream. The client can set up a single video stream and a single audio stream. Once established, client to server calls are used to send feedback about the client state such as the plurality of ROIs and resolutions currently being viewed, and the decode capacity. This feedback is sent to the culling block 1610 on the server-side and used to control the removal of virtual streams and temporal decimation of container frames.

Feedback Block

The feedback block 1624 takes feedback from decoders 1622 and presentation blocks 1614 and forwards that information to the culling blocks 1610.

The feedback block 1624 also accepts a quality bias factor which modifies the reported resolution of the user viewing window to force the culling blocks to bias to a lower resolution.

For example, a "maximum quality" bias may not modify the target resolution feedback to the culling blocks 1610, but reducing the quality level to "high quality" results in the feedback block 1624 dividing the target resolution by a factor of 2. In general for each step lower in quality the reported target resolution of an ROI from the feedback block is reduced by a factor of 2. In one example embodiment, four quality bias settings exist: Maximum, High, Normal, and Low.

In alternative embodiments, the feedback block 1624 may send outputs to culling blocks 1610 aside from resolution, ROI, and capacity. The feedback block 1624 may, for example, specify which particular virtual streams the culling blocks 1610 are to include or exclude. Control servers that accept direct culling commands for virtual streams would not need to be upgraded to understand improved strategies from newer clients as the logic for culling could be completely encapsulated on the client. This also reduces the complexity of the feedback to the culling blocks 1610, since they only need to consider the virtual stream list, and moves the complexity of which virtual streams to include or exclude to the feedback block. In this example embodiment, the response 600 comprises sufficient information for the feedback block 1624 to make decisions about which of the virtual streams to include or exclude prior to receiving the virtual streams themselves.

Decode Block

The decode block 1622 provides encoding format specific decode functionality. It consists of decoder contexts that are capable of decoding supported encodings such as H.264, JPEG, and JPEG 2000. It provides FIFO ordered decoding on per-session basis and load balancing between all other existing decode sessions. The output of the decode block 1622 is a raw bitmap or, in the case of virtual streams, a list of bitmaps and their associated ROIs. The output pixel format depends on the encoding. Typical formats are YUV 4:2:0 or 4:2:2.

A similar decoding 1622 block exists for audio.

Presentation Block

FIG. 16 shows a presentation block 1614, which manages compositing and display of virtual streams from a single-source device. The presentation block 1614 also provides audio/video synchronization functionality and synchronization with other sessions via a common clock source (T on FIG. 16). Note that because a single video source can be displayed on multiple windows with differing ROIs and resolutions, the presentation block provides a form of display multiplexing for the video source. As illustrated in FIG. 16, a source video frame is decoded once and then run through each of the individual presentation block sub-units which provide window-specific state and compositing.

Within each presentation block 1614 is a compositor block responsible for taking the list of raw-output bitmaps from a decoded container frame and composing those into the backbuffer of the display window using the current ROI and resolution of the backbuffer. Example pseudocode for a method for compositing a video-image to the backbuffer is as follows:

```
sort vStreams from lowest to highest resolution
for each vStream in sorted list
{
    normalized_intersection = Intersect(Normalize(vStream.roi),
    Normalize(viewingRoi));
    inputRoi = Transform normalized_intersection into vStream.roi;
    outputRoi = Transform normalized_intersection into viewingRoi;
    CopyAndScale(vStream, inputRoi, backbuffer, outputRoi);
}
```

Pseudocode Example

The copy and scale operation copies the inputRoi from the input data and stretches and writes it to the outputRoi in the output data.

Figure 17:
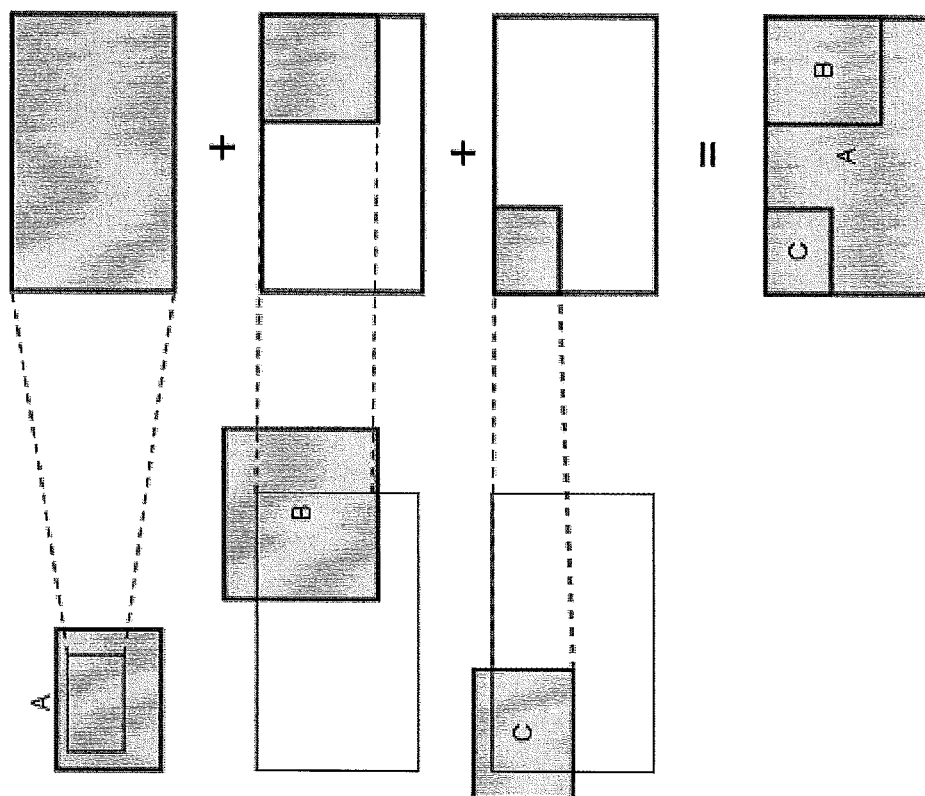
FIG. 17 depicts an example application of an image compositing method.

FIG. 17 depicts an example of the compositing method being applied. Three (3) ROIs are used in this example. The first ROI (ROI A) covers the entire source image region, but is of low resolution. The second and third ROIs (B and C) cover portions of the source image region, but are higher resolution with respect to the number of pixels sampled from the source. In an example compositing method, ROI A, which is the lowest resolution ROI, is copied first. The copying comprises finding the intersection of the current viewing ROI, copying the intersected region of ROI A, and stretching it to fill a backbuffer. In an example scenario, ROI B, which has a higher resolution, is copied next. The intersection of ROI B with the viewing region is found, the intersection is projected to the back-buffer, and copied over the existing ROI A data in the backbuffer since the ROI B data is higher resolution data. An analogous process is performed for ROI C with ROI C being copied over existing ROI A data in the backbuffer.

In the example embodiment, compositing ROIs from lowest to highest resolution results in the highest resolution image data being written last. A method that generates composites from highest to lowest resolution would have resulted in ROI A overwriting ROIs C and B, which would result in a lower quality video image.

Accordingly, applicant has disclosed systems and methods for streaming multiple encodings encoded using different encoding parameters. In a disclosed embodiment, a video source is encoded to form a plurality of virtual streams, where each virtual stream may be encoded using a different parameter. The virtual streams encoded from a common source video frame are multiplexed together into a container frame, which is transmitted to a server for storage and/or presentation.

Although the above discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the above describes example methods and apparatus, persons having ordinary skills in the art will readily appreciate that the examples provided are not the only way to implement such methods and apparatus. For example, the methods may be implemented in one or more pieces of computer hardware, including processors and microprocessors, Application Specific Integrated Circuits (ASICs), and/or other hardware components.

It is contemplated that any part of any aspect or embodiment discussed in this specification can be implemented or combined with any part of any other aspect or embodiment discussed in this specification.

With respect to the methods described herein including, for example, those described in connection with FIGS. 8-10 and 13-15, it will be appreciated that in some instances, the component portions of the described methods may be performed in an order other than is described herein. Also, it will be appreciated that not all of the blocks described in the flowcharts are required to be performed, that additional blocks may be added, and that some of the illustrated blocks may be substituted with other blocks.

The present disclosure has described various systems and methods with regard to one or more embodiments. However, it will be apparent to persons skilled in the art that a number of variations and modifications can be made without departing from the teachings of the present disclosure. For example, while the Figures and description herein refer to camera 118/video source device 316 and control server 102/302 separately, in some embodiments the functionality from both described systems may exist in a single system. For example, the video source device 316 may be a camera system that provides all of the functionality described herein relating to cameras and image collection, as well as the functionality described herein relating to control server 102. In such an embodiment, a camera system may operate as a server with the ability to control and communicate with other camera systems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for displaying video data, comprising:
a computing system receiving a container frame multiplexed amongst a plurality of container frames within one video stream, the container frame comprising a plurality of concatenated virtual frames, wherein each container and virtual frame comprises a frame header and delimiter, and each virtual frame corresponding to one of a plurality of encodings generated from a respective source video frame, and at least one of the plurality of virtual frames in the container frame are encoded using a different coding standard than at least another one of the plurality of virtual frames in the container frame;
where the plurality of encodings comprise a first encoding of a first region of interest of the source video frame and a second encoding of a second region of interest of the source video frame, the first region of interest and the second region of interest being non-identical, and the plurality of encodings comprise virtual stream identifiers;
the computing system determining a subset of the plurality of encodings to display, based on resource availability and received client parameters indicative of at least one region of interest and a resolution value, and the subset including the first encoding and the second encoding;
the computing system using the virtual stream identifiers of the received plurality of encodings to reconstruct the subset of the plurality of encodings; and
the computing system displaying on a monitor the subset including the first encoding and the second encoding.

2. The method of claim 1, wherein the container frame further comprises a container timestamp applicable to all of the virtual frames.

3. The method of claim 2, wherein the computing system displaying on a monitor the first encoding and the second encoding comprises displaying the first encoding and second encoding on adjacent portions of the monitor.

4. The method of claim 1, wherein the first region of interest and the second region of interest at least partially overlap.

5. The method of claim 4,
wherein the first region of interest is a subset of the second region of interest and the first encoding is encoded at a higher resolution than the second encoding, and
wherein the computing system displaying on a monitor the first encoding and the second encoding comprises displaying the first encoding and the second encoding simultaneously.

6. The method of claim 1,
wherein the plurality of encodings further comprise a third encoding of a third region of interest of the source video frame, the third region of interest encompassing the first region of interest and the second region of interest,
wherein the third encoding is encoded using a resolution less than resolutions employed to encode the first encoding and the second encoding, wherein the computing system displaying on a monitor the first encoding and the second encoding further comprises displaying the third encoding, the first encoding and the second encoding appearing over at least portions of the third encoding.

7. A method for composing video display data, comprising:
a computing system receiving a container frame multiplexed amongst a plurality of container frames within one inputted video stream, the container frame comprising a plurality of concatenated virtual frames, wherein each container and virtual frame comprises a frame header and delimiter, and each virtual frame corresponding to one of a plurality of encodings generated from a respective source video frame, and at least one of the plurality of virtual frames in the container frame are encoded using a different coding standard than at least another one of the plurality of virtual frames in the container frame;
where the plurality of encodings comprise a first encoding of a first region of interest of the source video frame and a second encoding of a second region of interest of the source video frame, the first region of interest and the second region of interest being non-identical, and the plurality of encodings comprise virtual stream identifiers;
the computing system determining a subset of the plurality of encodings to display, based on resource availability and received client parameters indicative of at least one region of interest and a resolution value, and the subset including the first encoding and the second encoding;
the computing system using the virtual stream identifiers of the received plurality of encodings to reconstruct the subset of the plurality of encodings;
the computing system combining the subset, including the first encoding and the second encoding, into a composite video stream; and
the computing system transmitting the composite video stream.

8. The method of claim 7, wherein the container frame further comprises a container timestamp applicable to all of the virtual frames.

9. The method of claim 8, wherein the computing system combining the first encoding and the second encoding comprises arraying the first encoding and second encoding on adjacent portions of subsequent frames of the composite video stream.

10. The method of claim 7, wherein the first region of interest and the second region of interest at least partially overlap.

11. The method of claim 10,
wherein the first region of interest is a subset of the second region of interest and the first encoding is encoded at a higher resolution than the second encoding, and
wherein the computing system combining the first encoding and the second encoding comprises combining the first encoding and the second encoding arraying the first encoding and the second encoding on each frame of the composite video stream.

12. The method of claim 7,
wherein the plurality of encodings further comprise a third encoding of a third region of interest of the source video frame, the third region of interest encompassing the first region of interest and the second region of interest, wherein the third encoding is encoded using a resolution less than resolutions employed to encode the first encoding and the second encoding,
wherein the computing system combining the first encoding and the second encoding further comprises combining the first encoding and the second encoding to appear over at least portions of the third encoding.

* * * * *